US009434074B2

(12) United States Patent
Tanigawa et al.

(10) Patent No.: US 9,434,074 B2
(45) Date of Patent: Sep. 6, 2016

(54) AUTONOMOUS RUNNING CONTROL METHOD AND DEVICE OF AUTONOMOUS RUNNING APPARATUS, AND PROGRAM FOR AUTONOMOUS RUNNING CONTROL DEVICE

(71) Applicant: Panasonic Intellectual Property Management Co., Ltd., Osaka (JP)

(72) Inventors: Toru Tanigawa, Osaka (JP); Jun Ozawa, Nara (JP); Yumi Wakita, Nara (JP); Katsuyoshi Yamagami, Osaka (JP); Eiichi Naito, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/568,551

(22) Filed: Dec. 12, 2014

(65) Prior Publication Data
US 2015/0100158 A1 Apr. 9, 2015

Related U.S. Application Data

(63) Continuation of application No. PCT/JP2014/001582, filed on Mar. 19, 2014.

(30) Foreign Application Priority Data

Mar. 21, 2013 (JP) .................................. 2013-058646

(51) Int. Cl.
*B25J 19/00* (2006.01)
*B25J 9/16* (2006.01)
*G05D 1/02* (2006.01)

(52) U.S. Cl.
CPC .......... *B25J 9/1666* (2013.01); *G05D 1/0212* (2013.01); *G05D 1/0246* (2013.01);
(Continued)

(58) Field of Classification Search
CPC ................ B25J 9/1676; B25J 9/1666; G05B 2219/40203; Y01S 901/01; Y01S 901/46
USPC .............. 700/253, 255, 259; 701/23, 25, 26, 701/300–302; 901/1, 46, 47; 382/153
See application file for complete search history.

(56) References Cited

U.S. PATENT DOCUMENTS

| 5,400,244 A * | 3/1995 | Watanabe | G05D 1/0242 180/404 |
| 8,504,202 B2 * | 8/2013 | Ichinose | G05D 1/024 700/253 |

(Continued)

FOREIGN PATENT DOCUMENTS

| JP | 2006-079325 | 3/2006 |
| JP | 2008-257531 | 10/2008 |

(Continued)

OTHER PUBLICATIONS

International Search Report issued Jun. 17, 2014 in International (PCT) Application No. PCT/JP2014/001582.

(Continued)

*Primary Examiner* — Dalena Tran
(74) *Attorney, Agent, or Firm* — Wenderoth, Lind & Ponack, L.L.P.

(57) ABSTRACT

In a running control method of a running apparatus, person moving direction and speed are estimated based on a person position history for predetermined time. It is decided whether contact with a person is likely to be made based on the estimation and running information about the running apparatus. When it is decided that the contact is likely to be made, a first route where the running apparatus avoids the person is generated for controlling running of the running apparatus therealong. It is decided whether the person has the intention to contact with the running apparatus based on the decision in the contact possibility deciding unit after the running along the first route. When it is decided that the person has the contact intention, a second route where the running apparatus approaches the person is generated for controlling the running of the running apparatus therealong.

19 Claims, 20 Drawing Sheets

(52) U.S. Cl.
CPC .............. *G05B 2219/39135* (2013.01); *G05B 2219/40201* (2013.01); *G05D 2201/0211* (2013.01); *Y10S 901/01* (2013.01); *Y10S 901/46* (2013.01); *Y10S 901/49* (2013.01)

(56) References Cited

U.S. PATENT DOCUMENTS

| | | | |
|---|---|---|---|
| 8,793,069 B2* | 7/2014 | Kuroda | G01S 11/12 700/245 |
| 9,075,416 B2* | 7/2015 | Ichikawa | B25J 9/1676 |
| 2008/0249662 A1 | 10/2008 | Nakamura | |
| 2009/0043440 A1 | 2/2009 | Matsukawa et al. | |

FOREIGN PATENT DOCUMENTS

| | | |
|---|---|---|
| JP | 2009-110495 | 5/2009 |
| JP | 2010-224878 | 10/2010 |

OTHER PUBLICATIONS

International Preliminary Report and Written Opinion of the International Searching Authority issued Oct. 1, 2015 in corresponding International Application No. PCT/JP2014/001582.

* cited by examiner

Fig. 4

| OBSERVING TIME | PERSON ID | POSITION (x,y) | CHARACTERISTIC INFORMATION |
|---|---|---|---|
| 2012/09/02_12:00:00:100 | PSN_001 | (850,150) | Red |
| 2012/09/02_12:00:00:100 | PSN_002 | (780,401) | Blue |
| 2012/09/02_12:00:00:200 | PSN_001 | (841,148) | Red |
| 2012/09/02_12:00:00:200 | PSN_002 | (791,402) | Blue |
| 2012/09/02_12:00:00:300 | PSN_001 | (830,147) | Red |
| 2012/09/02_12:00:00:300 | PSN_002 | (803,404) | Blue |
| 2012/09/02_12:00:00:400 | PSN_001 | (818,145) | Red |
| 2012/09/02_12:00:00:400 | PSN_002 | (814,401) | Blue |
| 2012/09/02_12:00:00:500 | PSN_001 | (807,148) | Red |
| 2012/09/02_12:00:00:500 | PSN_002 | (827,398) | Blue |
| 2012/09/02_12:00:00:600 | PSN_001 | (795,150) | Red |
| 2012/09/02_12:00:00:600 | PSN_002 | (840,397) | Blue |
| 2012/09/02_12:00:00:700 | PSN_001 | (781,152) | Red |
| 2012/09/02_12:00:00:700 | PSN_002 | (851,395) | Blue |
| 2012/09/02_12:00:00:800 | PSN_001 | (771,154) | Red |
| 2012/09/02_12:00:00:800 | PSN_002 | (860,397) | Blue |
| 2012/09/02_12:00:00:900 | PSN_001 | (759,153) | Red |
| 2012/09/02_12:00:00:900 | PSN_002 | (872,399) | Blue |
| ... | ... | ... | ... |

Fig.6A

| TIME | POSITION (x,y) | MOVING DIRECTION | MOVING SPEED | DESIRED POSITION |
|---|---|---|---|---|
| 2012/09/02_12:00:00:100 | (207,451) | 0° | 75cm/s | 701B:(1200,450) |
| 2012/09/02_12:00:00:200 | (215,450) | 0° | 75cm/s | 701B:(1200,450) |
| 2012/09/02_12:00:00:300 | (222,450) | 0° | 75cm/s | 701B:(1200,450) |
| 2012/09/02_12:00:00:400 | (230,451) | 0° | 75cm/s | 701B:(1200,450) |
| 2012/09/02_12:00:00:500 | (237,450) | 0° | 75cm/s | 701B:(1200,450) |
| 2012/09/02_12:00:00:600 | (245,449) | 0° | 75cm/s | 701B:(1200,450) |
| 2012/09/02_12:00:00:700 | (253,450) | 0° | 75cm/s | 701B:(1200,450) |
| 2012/09/02_12:00:00:800 | (260,450) | 0° | 75cm/s | 701B:(1200,450) |
| 2012/09/02_12:00:00:900 | (267,450) | 0° | 75cm/s | 701B:(1200,450) |
| ⋮ | ⋮ | ⋮ | ⋮ | ⋮ |

Fig.6B

| SHAPE | LENGTH (cm) | 60 |
|---|---|---|
| | WIDTH (cm) | 60 |
| | ROBOT ORIGIN | (0,0) |

Fig.6C

| | POSITION (x COORDINATE, y COORDINATE, ROBOT DIRECTION) |
|---|---|
| INITIAL POSITION | 701A:(-200, 450, 0) |
| RELAY POSITION | 701B:(1200, 450, 0)<br>701C:(2600, 450, 0)<br>701D:(4000, 450, 0)<br>701H:(4000, -2450, -90)<br>701G:(2600, -2450, 180)<br>701F:(1200, -2450, 180)<br>701E:(-200, -2450, 180) |
| DESIRED POSITION | 701A:(-200, 450, 90) |

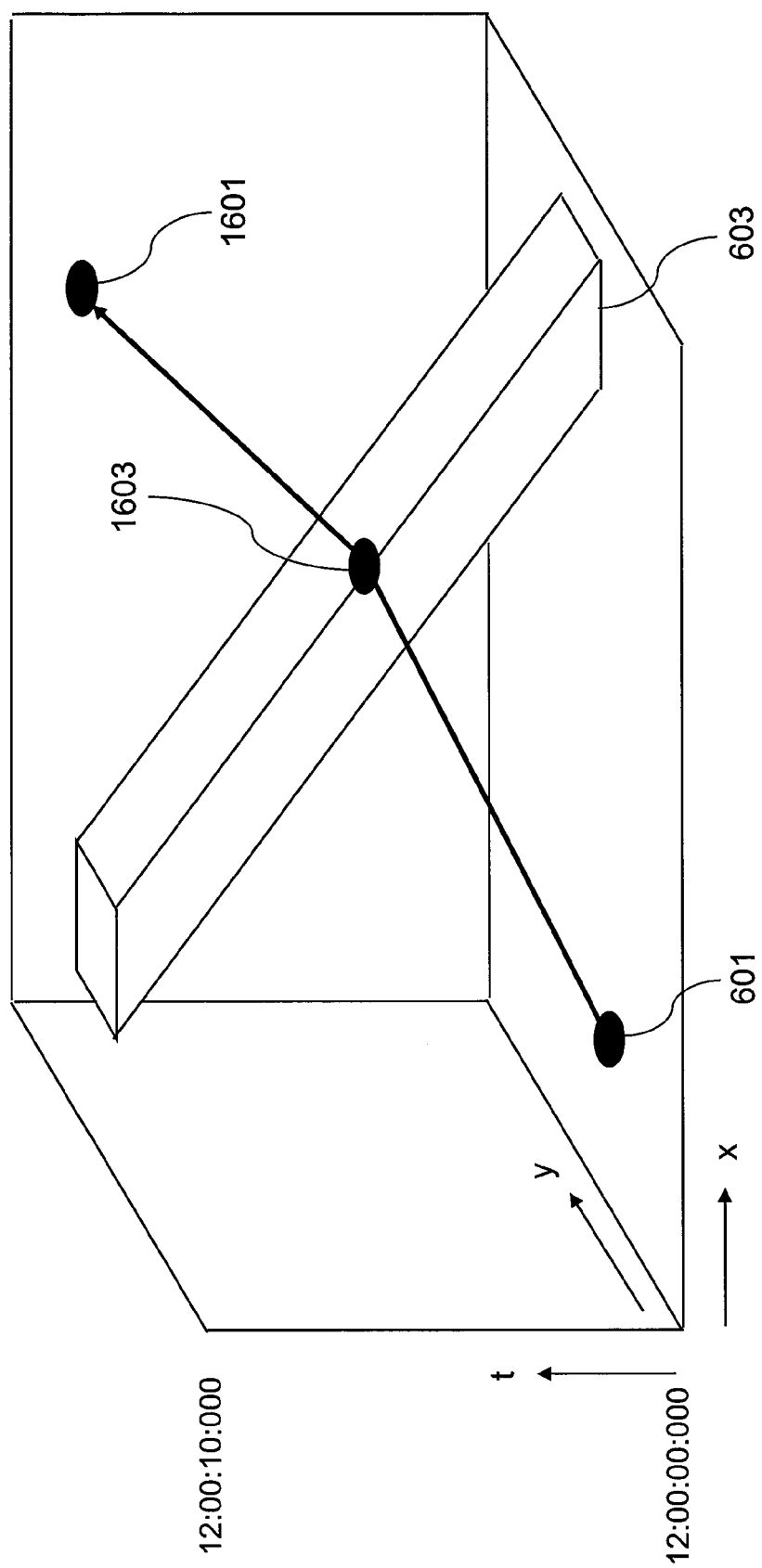

Fig.16

| NAME OF FACILITY OR EQUIPMENT | USABLE TIME | REGION |
|---|---|---|
| FIRST SHOP 205A | 7:00-19:00 | (0, 1000), (1000, 500) |
| SECOND SHOP 205B | 10:00-20:00 | (0, 0), (1000, -500) |
| THIRD SHOP 205C | 10:00-23:00 | (1500, 1000), (2500, 500) |
| FIRST CHAIR 702A | 0:00-24:00 | (1150, 300), (1300, 200) |
| SECOND CHAIR 702B | 0:00-24:00 | (2650, 300), (2800, 200) |
| THIRD CHAIR 702C | 0:00-24:00 | (1150, -2200), (1300, -2300) |
| ... | ... | ... |

AUTONOMOUS RUNNING CONTROL METHOD AND DEVICE OF AUTONOMOUS RUNNING APPARATUS, AND PROGRAM FOR AUTONOMOUS RUNNING CONTROL DEVICE

CROSS-REFERENCE TO RELATED APPLICATIONS

This is a continuation application of International Application No. PCT/JP2014/001582, with an international filing date of Mar. 19, 2014, which claims priority of Japanese Patent Application No.: 2013-058646 filed on Mar. 21, 2013, the content of which is incorporated herein by reference.

TECHNICAL FIELD

The technical field relates to an autonomous running control method and device of an autonomous running apparatus, and a program for the autonomous running control device that can make the autonomous running apparatus approach the person and provide information desired by the person when deciding whether the person who moves towards an autonomous running apparatus needs the autonomous running apparatus and the person needs the autonomous running apparatus, and can make the autonomous running apparatus avoid and pass the person when the person does not need the autonomous running apparatus.

BACKGROUND ART

Conventionally, as a method in which an information providing robot approaches a person, a technique that decides that the person who moves towards the robot is a person who needs the robot, and makes the robot move towards the person is known (Patent Literature 1).

CITATION LIST

Patent Literature

Patent Literature 1:
Japanese Unexamined Patent Publication No. 2010-224878

SUMMARY OF THE INVENTION

However, even when a moving direction of a person is a direction where a robot is present, the person does not necessarily need the robot. Examples of the reasons for this are "the person temporarily moves towards robot in order to avoid that obstacle in front", and "the destination for the person is located at the back of the robot".

When the robot is made to move towards the person although the person does not need the robot, the robot obstructs the person's path.

One non-limiting and exemplary embodiment provides an autonomous running control method and device of an autonomous running apparatus, and a program for the autonomous running control device that can make the autonomous running apparatus approach the person and provide information desired by the person when deciding whether the person who moves towards an autonomous running apparatus needs the autonomous running apparatus and the person needs the autonomous running apparatus, and can make the autonomous running apparatus avoid and pass the person when the person does not need the autonomous running apparatus.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: An autonomous running control method of an autonomous running apparatus for changing a running route of the autonomous running apparatus according to a motion of a person with respect to the autonomous running apparatus that runs towards a destination given in advance, the method comprising:

controlling running of the autonomous running apparatus along a first route where an autonomous running controller avoids the person when the person is likely to contact with the autonomous running apparatus according to a position history of the person for predetermined time;

deciding whether the person has an intention to approach the autonomous running apparatus in a contact intention deciding unit after the autonomous running apparatus runs along the first route;

generating a second route where the autonomous running apparatus approaches the person in an access route generating unit when decision is made that the person has the intention to approach the autonomous running apparatus; and controlling the running of the autonomous running apparatus along the second route in the autonomous running controller.

These general and specific aspects may be implemented using a system, a method, and a computer program, and any combination of systems, methods, and computer programs.

From the aspects of the present disclosure, even when a person moves towards the autonomous running apparatus, the person does not necessarily have an intention to contact the autonomous running apparatus and thus the autonomous running controller temporarily makes an avoiding motion along the first route where the autonomous running apparatus avoids the person. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus is made to contact with the person smoothly, so that the autonomous running apparatus can provide information to the person.

BRIEF DESCRIPTION OF THE DRAWINGS

These and other aspects and features of the present disclosure will become clear from the following description taken in conjunction with the embodiments thereof with reference to the accompanying drawings, in which:

FIG. 4 is a view illustrating one example of a person position history database of the information providing robot according to the first embodiment of the present disclosure;

FIG. 6A is a view illustrating one example of a robot database relating to a position, a moving direction, a moving speed and a desired position of the information providing robot at every predetermined measurement time according to the first embodiment of the present disclosure;

FIG. 6B is a view illustrating one example of a robot database relating to a shape of the information providing robot according to the first embodiment of the present disclosure;

FIG. 6C is a view illustrating one example of a robot database relating to an initial position, a relay position and the desired position of the information providing robot according to the first embodiment of the present disclosure;

FIG. 8B is a view illustrating one example of a route where the robot avoids the person that is generated by an avoiding route generating unit of the robot in a condition shown in FIG. 8A;

FIG. 16 is a view illustrating an example of equipment and facility data recorded as a part of the robot database of the information providing robot according to the second embodiment of the present disclosure;

DETAILED DESCRIPTION

Figure 1:
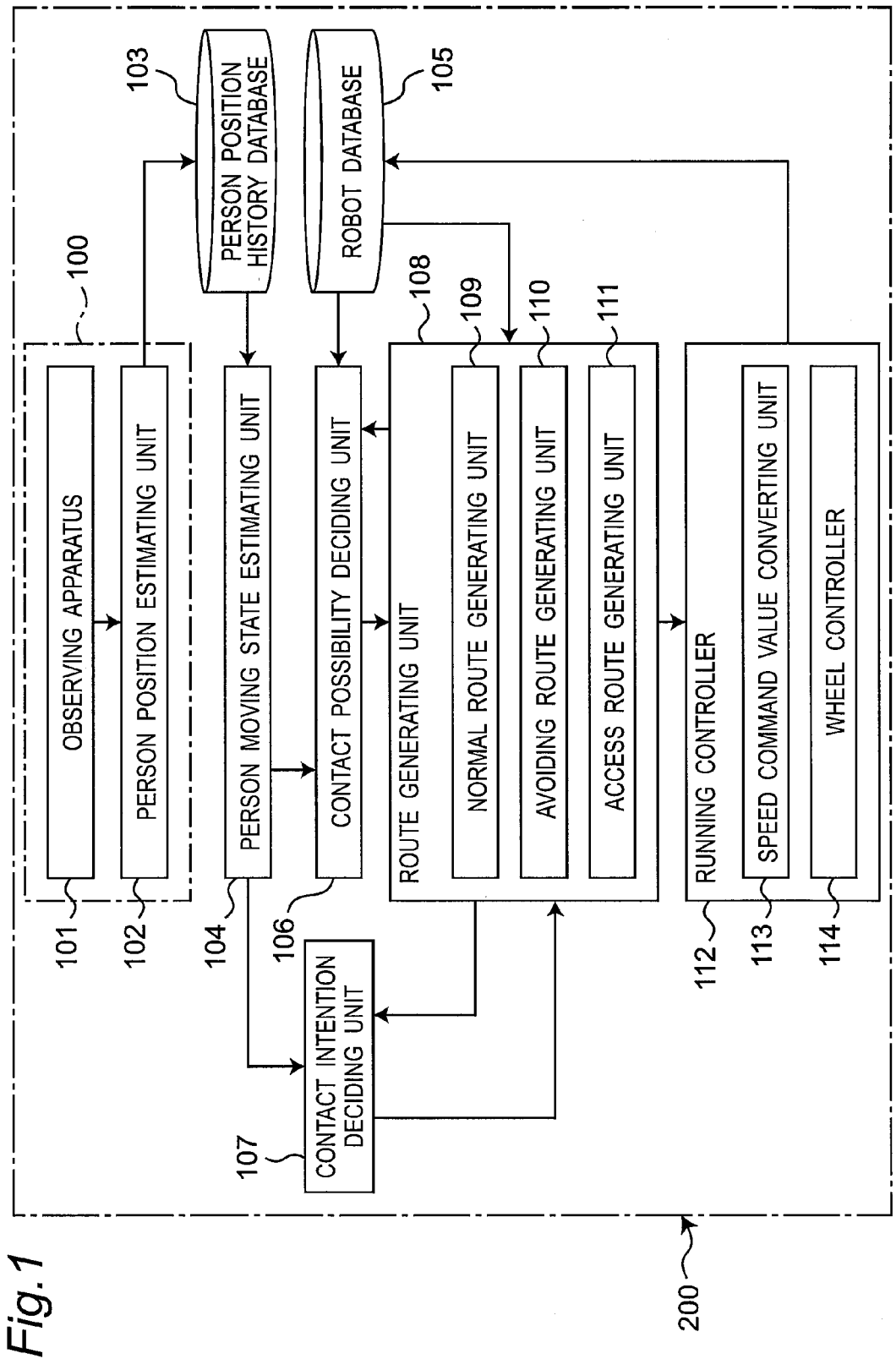
FIG. 1 is a block diagram illustrating a constitution of an information providing robot according to a first embodiment of the present disclosure.

Examples of the disclosed technique are as follows.

1st aspect: An autonomous running control method of an autonomous running apparatus for changing a running route of the autonomous running apparatus according to a motion of a person with respect to the autonomous running apparatus that runs towards a destination given in advance, the method comprising:

controlling running of the autonomous running apparatus along a first route where an autonomous running controller avoids the person when the person is likely to contact with the autonomous running apparatus according to a position history of the person for predetermined time;

deciding whether the person has an intention to approach the autonomous running apparatus in a contact intention deciding unit after the autonomous running apparatus runs along the first route;

generating a second route where the autonomous running apparatus approaches the person in an access route generating unit when decision is made that the person has the intention to approach the autonomous running apparatus; and controlling the running of the autonomous running apparatus along the second route in the autonomous running controller.

From the aspect of the present disclosure, even when a person moves towards the autonomous running apparatus, the person does not necessarily have an intention to contact the autonomous running apparatus and thus the autonomous running controller temporarily makes an avoiding motion along the first route where the autonomous running apparatus avoids the person. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus is made to contact with the person smoothly, so that the autonomous running apparatus can provide information to the person.

2nd aspect: The autonomous running control method of the autonomous running apparatus according to the 1st aspect, wherein the decision whether the person is likely to contact with the autonomous running apparatus is made by:

estimating a moving direction and a moving speed of the person based on the position history of the person for the predetermined time in a person moving state estimating unit; and deciding whether the person is likely to contact with the autonomous running apparatus in a contact possibility deciding unit based on the moving direction and the moving speed of the person estimated by the person moving state estimating unit and running information about running of the autonomous running apparatus from a first position to a second position.

From the above aspect, even when a person who moves towards the autonomous running apparatus is estimated by the person moving state estimating unit, the person does not necessarily have an intention to contact with the autonomous running apparatus, and thus the autonomous running controller temporarily makes an avoiding motion along the first route where the autonomous running apparatus avoids the person. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus is made to contact with the person smoothly, so that the autonomous running apparatus can provide information to the person.

3rd aspect: The autonomous running control method of the autonomous running apparatus according to the 2nd aspect, wherein when the contact possibility deciding unit decides that the contact is likely to be made, an avoiding route generating unit generates the first route.

From the above aspect, even when a person who moves towards the autonomous running apparatus is estimated by the person moving state estimating unit, the person does not necessarily have an intention to contact with the autonomous running apparatus, and thus the avoiding route generating unit temporarily generates the first route where the autonomous running apparatus avoids the person so that the autonomous running controller makes the avoiding motion along the first route. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus contacts with the person smoothly, so as to be capable of providing information to the person.

4th aspect: The autonomous running control method of the autonomous running apparatus according to the 3rd aspect, wherein after the autonomous running apparatus runs along the first route, the contact intention deciding unit decides whether the person has the intention to approach the autonomous running apparatus based on decision in the contact possibility deciding unit.

5th aspect: The autonomous running control method of the autonomous running apparatus according to the 4th aspect, wherein when the contact possibility deciding unit decides that the contact is unlikely to be made, a normal route generating unit generates a third route for moving to the destination, the autonomous running controller controls the running of the autonomous running apparatus along the third route.

From the above aspect, the normal route generating unit can regenerate the third route for moving to a destination of the autonomous running apparatus based on a position of the autonomous running apparatus at time when the contact intention deciding unit decides that the person does not have the intention to contact with the autonomous running apparatus. As a result, the autonomous running apparatus can move directly to the destination from a position after the autonomous running apparatus avoids the person along the third route generated by the normal route generating unit without returning to a position before the autonomous running apparatus avoids the person and then moving to the destination, and thus the time until the autonomous running apparatus arrives at the destination can be shortened.

6th aspect: The autonomous running control method of the autonomous running apparatus according to the 5th aspect, wherein when the contact possibility deciding unit decides that the autonomous running apparatus is likely to contact with the person, and the contact intention deciding unit does not decide that the person has the intention to approach the autonomous running apparatus, the autonomous running controller controls the running of the autonomous running apparatus along the first route.

From the above aspect, even when a person who moves towards the autonomous running apparatus is estimated by the person moving state estimating unit, the person does not necessarily have an intention to contact with the autonomous running apparatus, and thus the avoiding route generating unit temporarily generates an avoiding route where the autonomous running apparatus avoids the person, so that the autonomous running controller makes the avoiding motion. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus contacts with the person smoothly, so as to be capable of providing information to the person.

7th aspect: The autonomous running control method of autonomous running apparatus according to the 6th aspect, wherein the first route generated by the avoiding route generating unit is a route which avoids a region where the person moves based on the moving direction and moving speed of the person estimated by the person moving state estimating unit and where the autonomous running apparatus runs so that a route of the person and a route of the autonomous running apparatus do not cross each other.

From this aspect, when the moving trajectory of the person is regarded as a region so as to be avoided, the autonomous running apparatus can pass the person with a spatial allowance. That is to say, even when an error occurs in the running of the autonomous running apparatus, the likelihood of contact with the person at passing time can be reduced.

8th aspect: The autonomous running control method of the autonomous running apparatus according to the 7th aspect, wherein the first route generated by the avoiding route generating unit is a route where the autonomous running apparatus runs to a direction of a position of the person at time when the first route to be estimated by the person moving state estimating unit is generated so that the route of the person and the route of the autonomous running apparatus do not cross each other.

From this aspect, when the autonomous running apparatus avoids in the direction of the person at the time of generating the first route, and the person has the intention to contact with the autonomous running apparatus, the person changes the course to the direction of the autonomous running apparatus, so that the time until the contact with the autonomous running apparatus can be shortened.

9th aspect: The autonomous running control method of the autonomous running apparatus according to any one of the 6th to 8th aspects, wherein after the autonomous running apparatus starts to run along the second route generated by the avoiding route generating unit, the autonomous running apparatus runs along the second route until, at least, the person recognizes a change in a moving direction of the autonomous running apparatus.

From this aspect, since the likelihood that the person and the autonomous running apparatus contact with each other is eliminated for a period until the person recognizes a change in the moving direction of the autonomous running apparatus, the autonomous running apparatus can be prevented from generating the third route wrongly.

10th aspect: The autonomous running control method of the autonomous running apparatus according to any one of the 6th to 9th aspects, wherein after the autonomous running apparatus avoids the person, the avoiding route generating unit generates the first route so that an angle of change in a trajectory required for the person to contact with the autonomous running apparatus falls within a range of 30° to 50°.

From this aspect, while a labor required for changing the trajectory of the person is being reduced, the autonomous running apparatus can detect the change in the trajectory of the person.

11th aspect: The autonomous running control method of the autonomous running apparatus according to any one of the 6th to 10th aspects, wherein when the contact possibility deciding unit decides that the person is likely to contact with the autonomous running apparatus, and even when the contact intention deciding unit cannot decide the intention of the person to contact with the autonomous running apparatus based on information about opening hour of a shop present within a range where the autonomous running apparatus moves because the shop is not present in the moving direction of the person or the shop present in the moving direction of the person is outside the opening hour, the access route generating unit generates a second route where the contact with the person is made.

From this aspect, when a shop is not present in the moving direction of the person or a shop present in the moving direction of the person is outside business hours, even if the intention of the person to contact with the autonomous running apparatus cannot be decided, the access route generating unit can generate the access route for approaching the person.

12th aspect: An autonomous running control device of an autonomous running apparatus for changing a running route of the autonomous running apparatus according to a motion of a person with respect to the autonomous running apparatus that runs towards a destination given in advance, the apparatus comprising:

an avoiding route generating unit that generates a first route where the autonomous running apparatus avoids the person when the person is likely to contact with the autonomous running apparatus based on a position history of the person for predetermined time;

a contact intention deciding unit that decides whether the person has an intention to approach the autonomous running apparatus when the autonomous running apparatus runs along the first route generated by the avoiding route generating unit;

an access route generating unit that generates a second route where the autonomous running apparatus approaches the person when the contact intention deciding unit decides that the person has the intention to approach the autonomous running apparatus; and an autonomous running controller that controls running of the autonomous running apparatus along the first route or the second route.

13th aspect: The autonomous running control device of the autonomous running apparatus according to the 12th aspect, wherein the decision in the contact intention deciding unit whether the person has the intention to approach the autonomous running apparatus is made by:

a person position obtaining unit that obtains a position of the person at every predetermined time;

a person moving state estimating unit that obtains the position history of the person for predetermined time from a position of the person at every predetermined time obtained by the person position obtaining unit and estimates a moving direction and a moving speed of the person; and a contact possibility deciding unit that decides whether the person is likely to contact with the autonomous running apparatus based on the moving direction and moving speed of the person estimated by the person moving state estimating unit and running information for the autonomous running apparatus to run from a first position to a second position.

From this aspect, the person position obtaining unit records positions of the person in chronological order so that the person moving state estimating unit can accurately estimate the moving direction and a moving speed of the person.

14th aspect: The autonomous running control device of the autonomous running apparatus according to the 13rd aspect, further comprising:

a normal route generating unit that generates a third route for moving to the destination when the contact possibility deciding unit decides that the contact is unlikely to be made.

From the above aspect, the normal route generating unit can regenerate the third route for moving to a destination of the autonomous running apparatus based on a position of the autonomous running apparatus at time when the contact intention deciding unit decides that the person does not have the intention to contact with the autonomous running apparatus. As a result, the autonomous running apparatus can move directly to the destination from a position after the autonomous running apparatus avoids the person along the third route generated by the normal route generating unit without returning to a position before the autonomous running apparatus avoids the person and then moving to the destination, and thus the time until the autonomous running apparatus arrives at the destination can be shortened.

15th aspect: The autonomous running control device of the autonomous running apparatus according to the 14th aspect, wherein the autonomous running controller:

controls running of the autonomous running apparatus along the first route or the second route or the third route, and when the contact possibility deciding unit decides that the autonomous running apparatus is likely to contact with the person, and the contact intention deciding unit does not decide that the person has the intention to approach the autonomous running apparatus, controls the running of the autonomous running apparatus along the first route.

From this aspect, even when the contact possibility deciding unit decides that the autonomous running apparatus and the person are likely to contact with each other and the contact intention deciding unit does not decide that the person has an intention to approach the autonomous running apparatus, the running of the autonomous running apparatus is controlled according to the first route, so that the autonomous running apparatus does not suddenly run in front of the person and does not make the person change the route. The autonomous running apparatus makes a motion that does not trouble the person, and does not bring a sense of anxiety to the person.

16th aspect: The autonomous running control device of the autonomous running apparatus according to the 15th aspect, further comprising:

a person position history database in which the position of the person obtained by the person position obtaining unit is recorded in chronological order; and an autonomous running apparatus database having the running information for the autonomous running apparatus to run from the first position to the second position, wherein the person moving state estimating unit obtains the position history of the person for the predetermined time from the position of the person at every predetermined time recorded in the person position history database, and estimates the moving direction and moving speed of the person, the contact possibility deciding unit decides whether the person is likely to contact with the autonomous running apparatus based on the moving direction and moving speed of the person estimated by the person moving state estimating unit, and the running information recorded in the autonomous running apparatus database.

From this aspect, positions of the person are recorded in chronological order so that the moving direction and a moving speed of the person can be accurately estimated.

17th aspect: The autonomous running control device of the autonomous running apparatus according to any one of the 12th to 16th aspects, wherein after the autonomous running apparatus avoids the person, the avoiding route generating unit generates the first route to contact with the autonomous running apparatus so that an angle of change in a trajectory required for the person to contact with the autonomous running apparatus falls within a range of 30° to 50°.

From this aspect, while a labor required for changing the trajectory of the person is being reduced, the autonomous running apparatus can detect the change in the trajectory of the person.

18th aspect: The autonomous running control device of the autonomous running apparatus according to the 16th aspect, wherein at least an opening hour of a shop present within a range where the autonomous running apparatus moves are recorded in the autonomous running apparatus database, when the contact possibility deciding unit decides that the person is likely to contact with the autonomous running apparatus, and even when the contact intention deciding unit cannot decide the intention of the person to contact with the autonomous running apparatus based on information about the opening hour of the shop present within the range where the autonomous running apparatus moves because the shop is not present in the moving direction of the person or the shop present in the moving direction of the person is outside the opening hour, the access route generating unit generates the second route where the contact with the person is made.

From this aspect, when a shop is not present in the moving direction of the person or a shop present in the moving direction of the person is outside business hours, even if the intention of the person to contact with the autonomous running apparatus cannot be decided, the access route generating unit can generate the access route (second route) for approaching the person.

19th aspect: A program for an autonomous running control device of an autonomous running apparatus for changing a running route of the autonomous running apparatus according to a motion of a person with respect to the autonomous running apparatus running towards a destination given in advance, the program making a computer function as:

an avoiding route generating unit that generates a first route where the autonomous running apparatus avoids the person when the person is likely to contact with the autonomous running apparatus according to a position history of the person for predetermined time;

a contact intention deciding unit that decides whether the person has an intention to approach the autonomous running apparatus when the autonomous running apparatus runs along the first route generated by the avoiding route generating unit;

an access route generating unit that generates a second route where the autonomous running apparatus approaches the person when the contact intention deciding unit decides that the person has the intention to approach the autonomous running apparatus; and an autonomous running controller that controls running of the autonomous running apparatus along the first route or the second route.

From the aspect of the present disclosure, even when a person moves towards the autonomous running apparatus, the person does not necessarily have an intention to contact the autonomous running apparatus and thus the autonomous running controller temporarily makes an avoiding motion along the first route where the autonomous running apparatus avoids the person. As a result, the contact intention deciding unit can decide whether the person who changes a trajectory according to the avoiding motion of the autonomous running apparatus is a person who truly has an intention to contact with the autonomous running apparatus. As a result, since the autonomous running apparatus avoids the person who does not have the intention to contact with the autonomous running apparatus, a danger of the contact is eliminated, and thus the apparatus makes the motion that does not trouble the person. The contact intention deciding unit decides whether the person has the intention to contact with the autonomous running apparatus based on the later change in the trajectory of the person who has the intention to contact with the autonomous running apparatus, and the autonomous running apparatus is made to contact with the person smoothly, so that the autonomous running apparatus can provide information to the person.

Referring now to the accompanied drawings the embodiments of the present disclosure will be described in detail below.

First Embodiment

<Description of Constitution of Information Providing Robot>

FIG. 1 is a view illustrating the constitution of the information providing robot according to the first embodiment of the present disclosure.

An information providing robot 204 according to the first embodiment of the present disclosure functions as one example of an autonomous running apparatus, has an autonomous running control device 200, and is adapted to be capable of changing a running route of the robot 204 according to the motion of the person 203 with respect to the robot 204. The autonomous running control device 200 has an observing apparatus 101, a person position estimating unit 102, a person moving state estimating unit 104, a contact possibility deciding unit 106, a contact intention deciding unit 107, a route generating unit 108 (at least an avoiding route generating unit 110 and an access route generating unit 111), and a running controller 112. Further, the autonomous running control device 200 may have a person position history database 103 and a robot database 105. The observing apparatus 101 and the person position estimating unit 102 function as one example of a person position obtaining unit 100.

Figure 2:
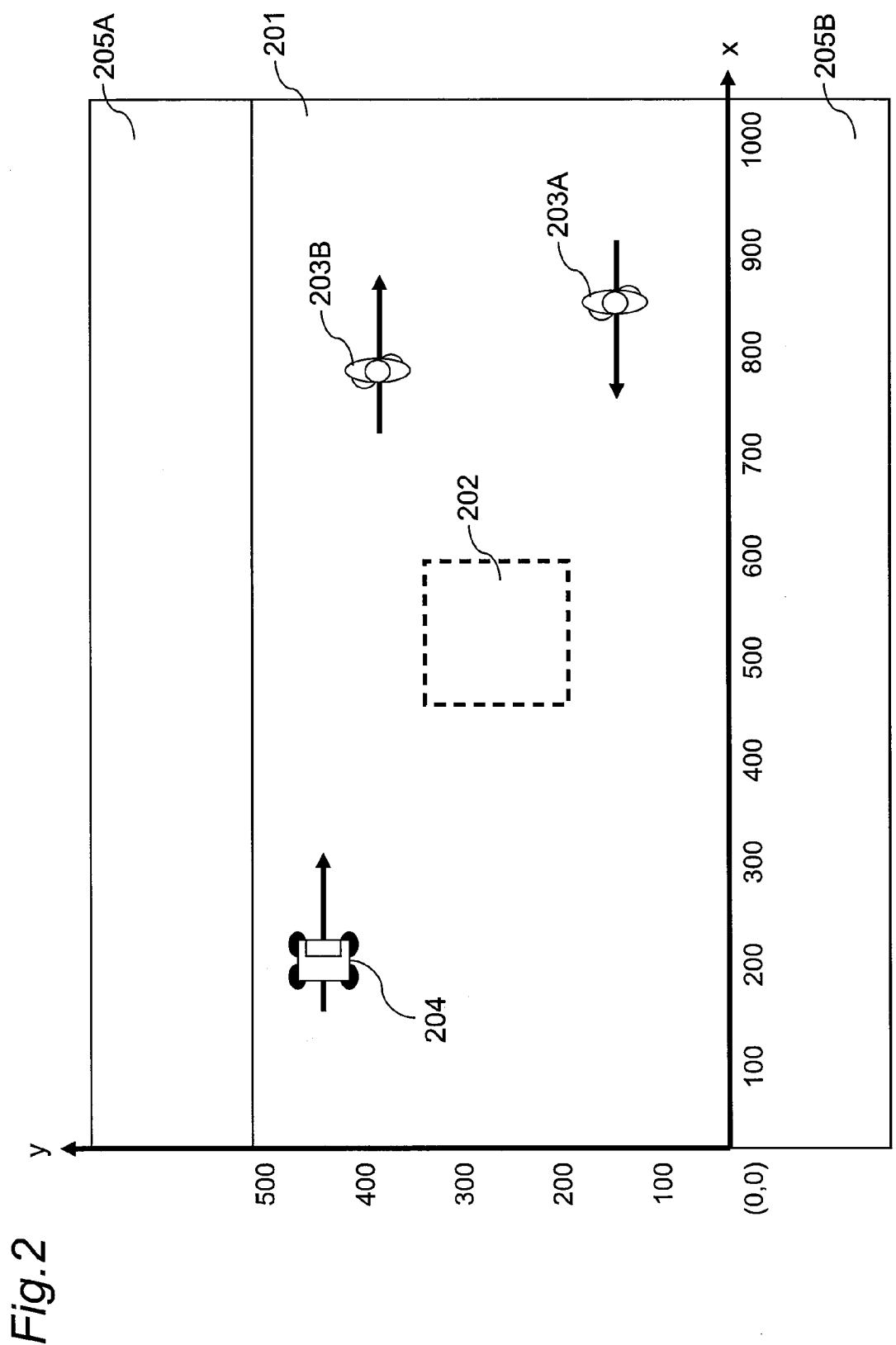
FIG. 2 is a view illustrating one example of a passage in a commercial facility where the information providing robot according to the first embodiment of the present disclosure operates.

Further, FIG. 2 illustrates an example of one section of a commercial facility having a passage 201 as one example of an environment where the person 203 and the robot 204 are coexist that has an image sensor 202 as one example of the observing apparatus 101. At least one passage 201 is present in the section. A first person 203A and a second person 203B that are users of the commercial facility, and the robot 204 that functions as one example of the autonomous running apparatus for providing information to a user of the commercial facility are present on the passage 201, and the image sensor 202 that is provided to a ceiling of the passage 201 captures their positions. Further, a first shop 205A and a second shop 205B are present on the side of the passage 201.

Figure 3:
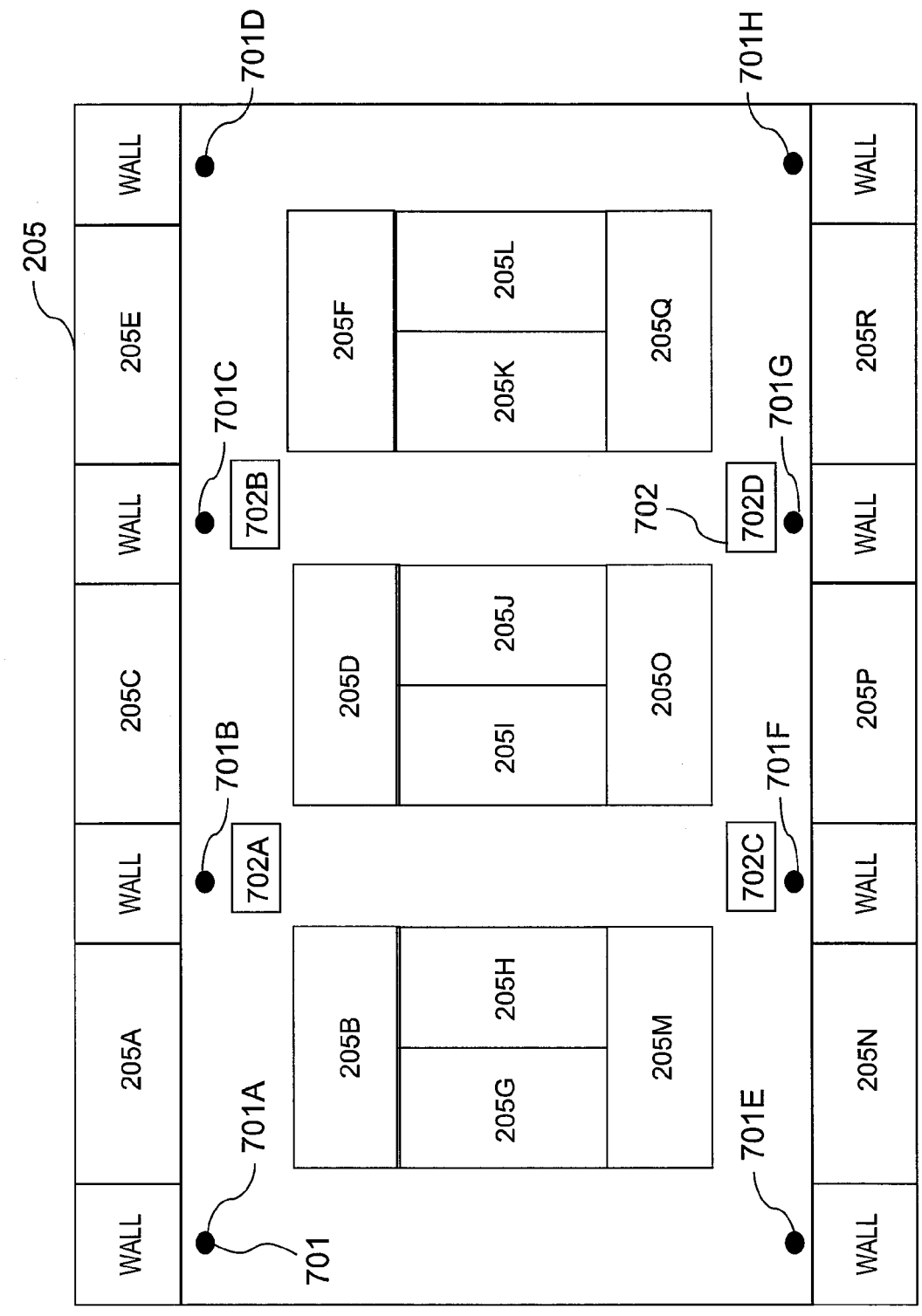
FIG. 3 is an entire plan view illustrating one example of commercial facility of the information providing robot according to the first embodiment of the present disclosure.

Further, FIG. 3 is an entire plan view illustrating the commercial facility. In the entire plan view of FIG. 3, a first relay position 701A to an eighth relay position 701H that can be set as relay positions of the robot 204, a first shop 205A to an eighteenth shop 205R, and a first chair 702A to a fourth chair 702D are described (recorded). The robot 204 moves to a desired position that is preset via the first relay position 701A to the eighth relay position 701H in preset order. The relay positions are set at every intersection or every turn. With such setting, the robot 204 can pass through the relay positions in present order until arrival from the initial position of the robot 204 to the desired position so as to be capable of moving entirely through only direct advance. A concrete example of the order of presetting the replay positions is 701A→701E→701F→701B→701C→701G→701H→701D. In this case, the fourth relay position 701D is one example of the desired position. Further, the first chair 702A to the fourth chair 702D for the users of the commercial facility having a break are provided to the passage 201.

The number of persons who move in and out the passage 201 is not limited, and any person of the first person 203A, the second person 203Bs, and another person who is not present in a drawn range of FIG. 2 is described typically as the person 203. Similarly, any one of the first shop 205A to the eighteenth shop 205R is determined as the shop 205, any relay position of the first relay position 701A to the eighth relay position 701H is determined as the relay position 701, and any chair of the first chair 702A to the fourth chair 702D is determined as chair 702. They are typically described.

<Description of the Observing Apparatus 101>

The observing apparatus 101 observes a mobile object present within an observing range of the observing apparatus 101 on a predetermined observing cycle (for example, 100 msec). When the observing apparatus 101 is the image sensor 202, the image sensor 202 obtains an image, and outputs the obtained image information as an observed value to the person position estimating unit 102.

<Description of the Person Position Estimating Unit 102>

The person position estimating unit 102 estimates a person ID and a position of the person 203 present within the observing range of the observing apparatus 101 based on the observed value obtained and input by the observing apparatus 101. When the observing apparatus 101 is the image sensor 202, for example, the person position estimating unit 102 can estimate the ID and the position of the person using the background differencing technique. The estimated position of the mobile object is output from the person position estimating unit 102 to the person position history database 103.

In the background differencing technique, the person position estimating unit 102 compares a background image of the passage 201 that is obtained in advance by the image sensor 202 when the person 203 is not present with an image at present (at time of the observation in the image sensor 202) obtained by the image sensor 202. Thereafter, a region whose pixel value is different is taken out as a difference region by the person position estimating unit 102. Since a noise is likely to be mixed in the image, when the person position estimating unit 102 can decide that the difference region is sufficiently small with respect to the person, the person position estimating unit 102 may decide that the difference region is not the person 203. The case where the difference region is sufficiently small with respect to the person is considered to be a case where a pixel number of the difference region is not more than a threshold value preset based on a minimum pixel number with which the mobile object can be recognized. The detected position of the person 203 can be, for example, a centroid position of the difference region.

<Description of the Person Position History Database 103>

The person position history database 103 functions as one example of a person position history database. At least the person ID and the position of the person 203 estimated to be obtained by the person position estimating unit 102 as well as time when the observing apparatus 101 performs observation are recorded as history information about the positions for the respective person IDs into the person position history database 103. FIG. 4 illustrates an example of the person position history database 103. The person ID allocated to the person 203 and the position of the person 203, the time when the person 203 is observed, and characteristic information of the person 203 are recorded in the person position history database 103 of FIG. 4. As the characteristic information, when the image sensor 202 is used in the observing apparatus 101, for example, color information of the detected person 203 can be used. In order to simplify the description in the example of FIG. 4, the characteristic is expressed by only one color such as "Red" or "Blue", and a proportion of colors included in the actually detected region of the person 203 (color histogram) may be recorded as the characteristic information. Further, the person ID is uniquely allocated by the observing apparatus 101, and is an internal ID for the robot 204 to individually discriminate the person 203. For example, the person 203 is detected on a position (850,150) and a position (780,401) at 12:00:00:100 Sep. 2, 2012. "Red" is extracted as the characteristic information from the person 203 detected on the position (850, 150), and "PSN 001" is allocated to the person ID.

<Description of the Person Moving State Estimating Unit 104>

The person moving state estimating unit 104 functions as one example of the person moving state estimating unit, and estimates the moving direction and the moving speed at present (at the time of the observation in the image sensor 202) of the person 203 with each person ID based on each history of each position of each person ID (for example, position history of a person for predetermined time) recorded in the person position history database 103. The estimated information is output from the person moving state estimating unit 104 to the contact possibility deciding unit 106 and the contact intention deciding unit 107. Thereafter, the current position (at present), the moving direction and the moving speed of the person 203 are collectively termed "the moving state of the person 203". The current position of the person 203 is the latest position recorded in the person position history database 103.

Figure 5:
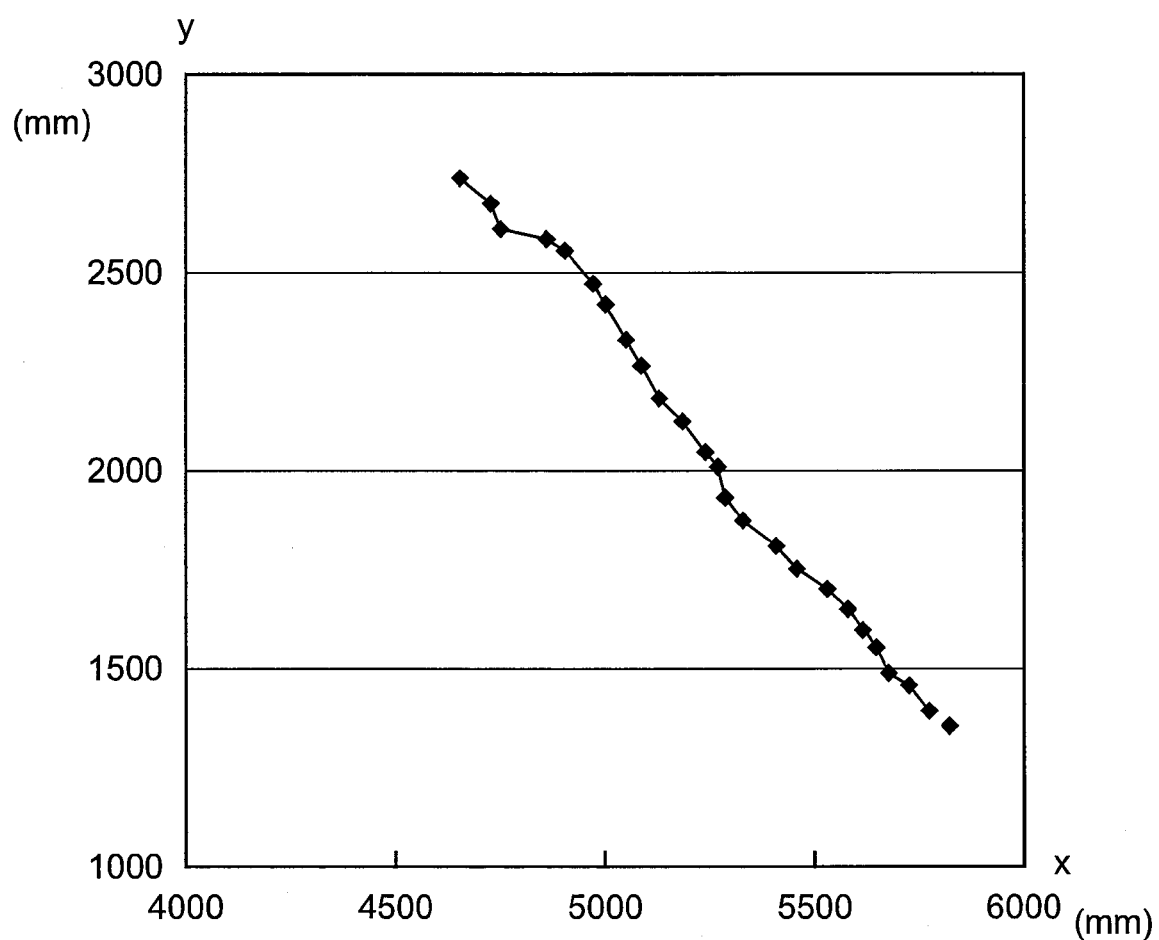
FIG. 5 is a view illustrating one example of a walking cycle of the person from the information providing robot according to the first embodiment of the present disclosure.

The moving direction can be obtained by the person moving state estimating unit 104 according to the linear approximation of the least square method. Further, the number of the position histories to be used for the approximation is desirably fitted to a walking cycle of the person 203. FIG. 5 illustrates an example of the trajectory at time when the person actually advances straight from a lower right coordinate position to an upper left coordinate position on an xy coordinate. A black square indicates the position of a person at each observation period. When the person puts center of gravity over the right food, a body leans to the right, and the position of the person also slightly leans to the right. That is to say, when only a history at time when the person puts center of gravity over the right foot is used, the person 203 is likely to be estimated wrongly that the person 203 turns right although actually advancing straight. For this reason, the number of the position histories to be used for the approximation is fitted to the walking cycle of the person 203, so that wrong estimation can be eliminated. Further, the person moving state estimating unit 104 can set an average speed in the histories used for the approximation as the moving speed.

<Description of the Robot Database 105>

The robot database 105 functions as one example of the database of the autonomous running apparatus. At least information about the position, the moving direction, the moving speed, and the desired position (running information about the robot 204) at present (at the time of the observation in the image sensor 202) of the robot 204 is recorded in the robot database 105 in advance.

FIG. 6A to FIG. 6C illustrate examples of the robot database 105.

The information about the position, the moving direction, the moving speed, and the desired position of the robot 204 (the running information about the robot 204) in every 100 millisecond that is one example of the predetermined observation period is recorded in the robot database 105 in FIG. 6A. Thereafter, the current position, moving direction, and the moving speed of the robot 204 are collectively termed "the moving state of the robot 204". The moving state of the robot 204 is, in other words, running information for the robot 204 to run from a first position (current position) to a second position (the relay position up to the desired position, or the desired position). The current position of the robot 204 is the latest position recorded in the robot database 105. The moving direction, the moving speed, and the desired position of the robot 204 are moving control parameters that are programmed in advance by the robot 204. For example, the use of odometry is considered for the current position of the robot 204. The odometry is a method for measuring an amount of the movement of the robot 204 based on an rotary angle of wheels of the robot 204, and when the initial position of the robot 204 is already known, the position of the running robot 204 can be calculated by a speed command value converting unit 113 of the running controller 112, described later, according to the odometry. Further, similarly to the person 203, a position of the robot 204 may be detected by the image sensor 202.

Further, FIG. 6B illustrates an example of information about the shape of the robot 204 composing a part of the robot database 105. The height and width of the robot 204, and information about an origin of the robot 204 are recorded in the robot database 105 of FIG. 6B. The position of the robot 204 is a position of the origin of the robot 204 on the passage 201.

Further, FIG. 6C illustrates an example of information about the initial position, the relay position, and the desired position of the robot 204 that is a part of the robot database 105. The robot 204 moves from the initial position to the relay position 701 sequentially, so as to arrive at the desired position.

<Description about the Contact Possibility Deciding Unit 106>

The contact possibility deciding unit 106 decides whether the person 203 and the robot 204 are likely to contact with each other based on the moving state of the person 203 input from the person moving state estimating unit 104 and the moving state of the robot 204 (the running information for the robot 204 to run from the first position to the second position) obtained from the robot database 105. The decided information is output from the contact possibility deciding unit 106 to the route generating unit 108. A signal representing whether an avoiding route is generated is input from the avoiding route generating unit 110 to the contact possibility deciding unit 106.

As a method for deciding the likelihood of the contact between the person 203 and the robot 204, for example, a method in which the contact possibility deciding unit 106 generates a configuration space, and then the contact possibility deciding unit 106 decides whether the trajectory of the robot 204 is included in a region formed by the person 203 (a region including a region where the person 203 is going to move) in a space including a time axis (t) is considered.

Figure 7:
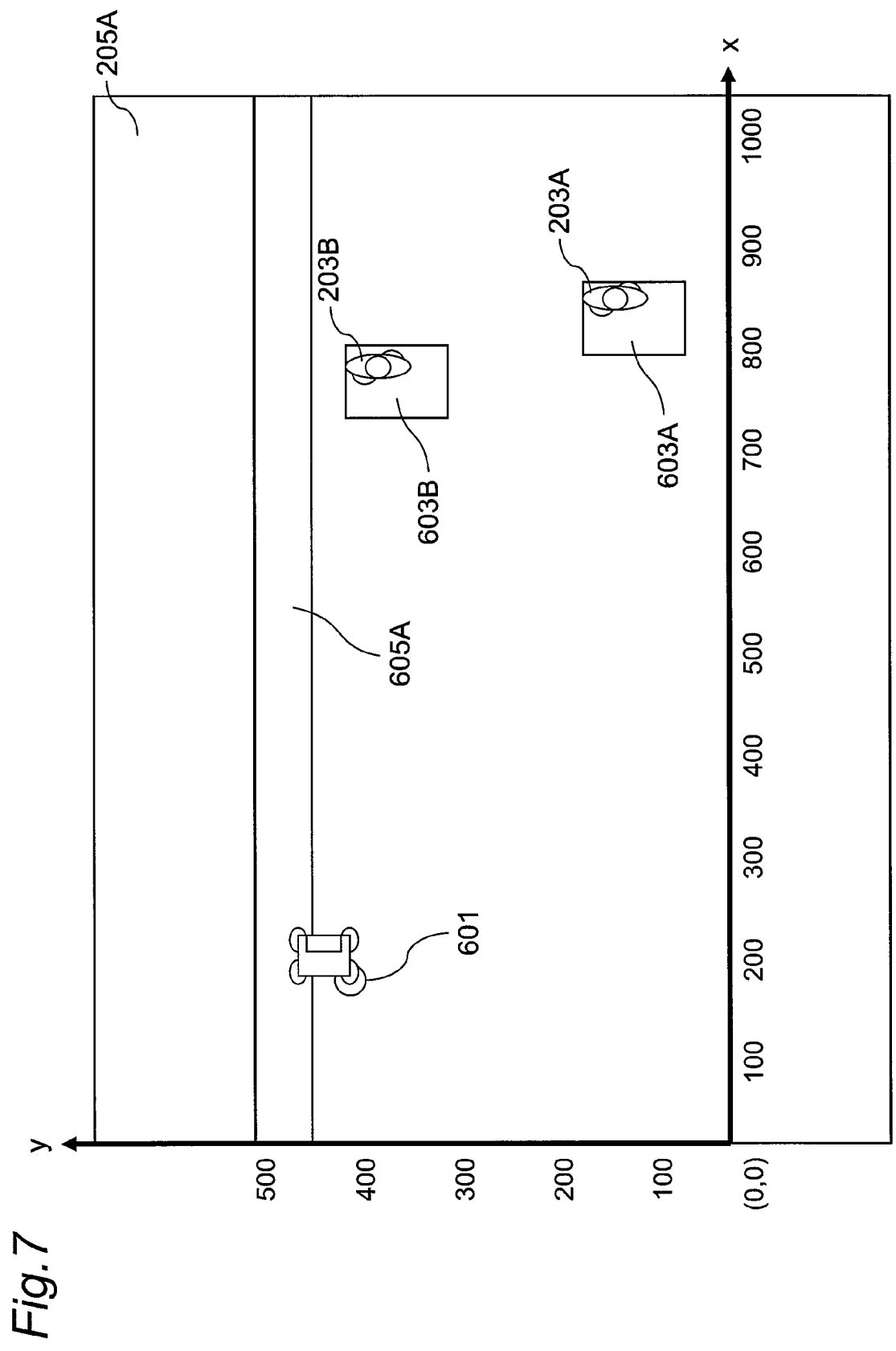
FIG. 7 is a view illustrating one example of a configuration space of the information providing robot according to the first embodiment of the present disclosure.

The configuration space is a method for extending a space (dimension) and regarding the robot 204 as a point so as to facilitate path planning, and is frequently used for the path planning of the robot 204. FIG. 7 illustrates an example of the configuration space. FIG. 2 illustrates the arrangement of the person 203 and the robot 204 on the passage 201 before the configuration space is generated, and FIG. 7 illustrates a condition after the configuration space is generated. The robot 204 is expressed by a point 601. That is to say, the regions of the person 203 and the shop 205 that are peripheral obstacles (for the robot 204) are extended by the size of the robot 204. The extended region of the first person 203A is set as an extended region 603A, the region of the second person 203B is set as an extended region 603B, and the region of the first shop 205A is set as an extended region 605A. Since the region of the second shop 205B is not extend to a +y direction, drawing is omitted. Further, the shape of the person 203 is considered to be approximate to, for example, a circle whose radius is 30 cm from the detected position of the person 203 as the center. Since the robot 204 in the first embodiment does not move to a height direction, a dimension in the height direction is omitted.

When the point robot 601 expressed by a point advances into an extended region 603 of the person 203, the person 203 contacts with the robot 204.

Figure 8A:
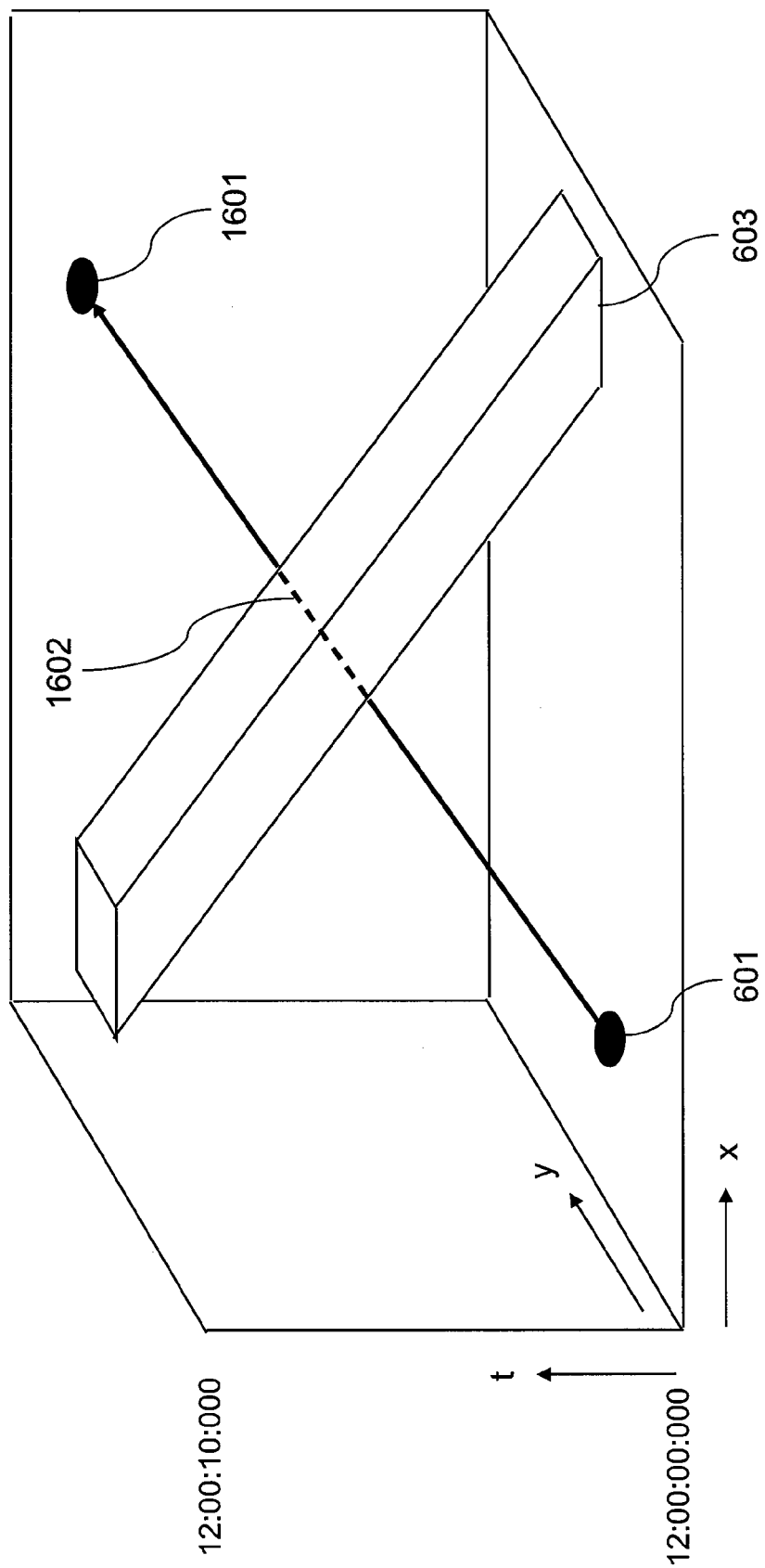
FIG. 8A is a view illustrating one example of a three-dimensional configuration space of the information providing robot according to the first embodiment of the present disclosure.

FIG. 8A illustrates one example of a (x,y,t) three-dimensional configuration space. In the example of FIG. 8A, it is assumed that the person 203 and the robot 204 move with the moving speed and the moving direction at present (at the time of the observation in the image sensor 202) being maintained. A broken line portion in FIG. 8A is a portion where the point robot 601 advances into the extended region 603, namely, a contact portion 1602 where the person 203 and the robot 204 contact with each other. This represents that the person 203 contacts with the robot 204 on a position (x,y) represented by the contact portion 1602 at time (t) indicated by the contact portion 1602.

Figure 9:
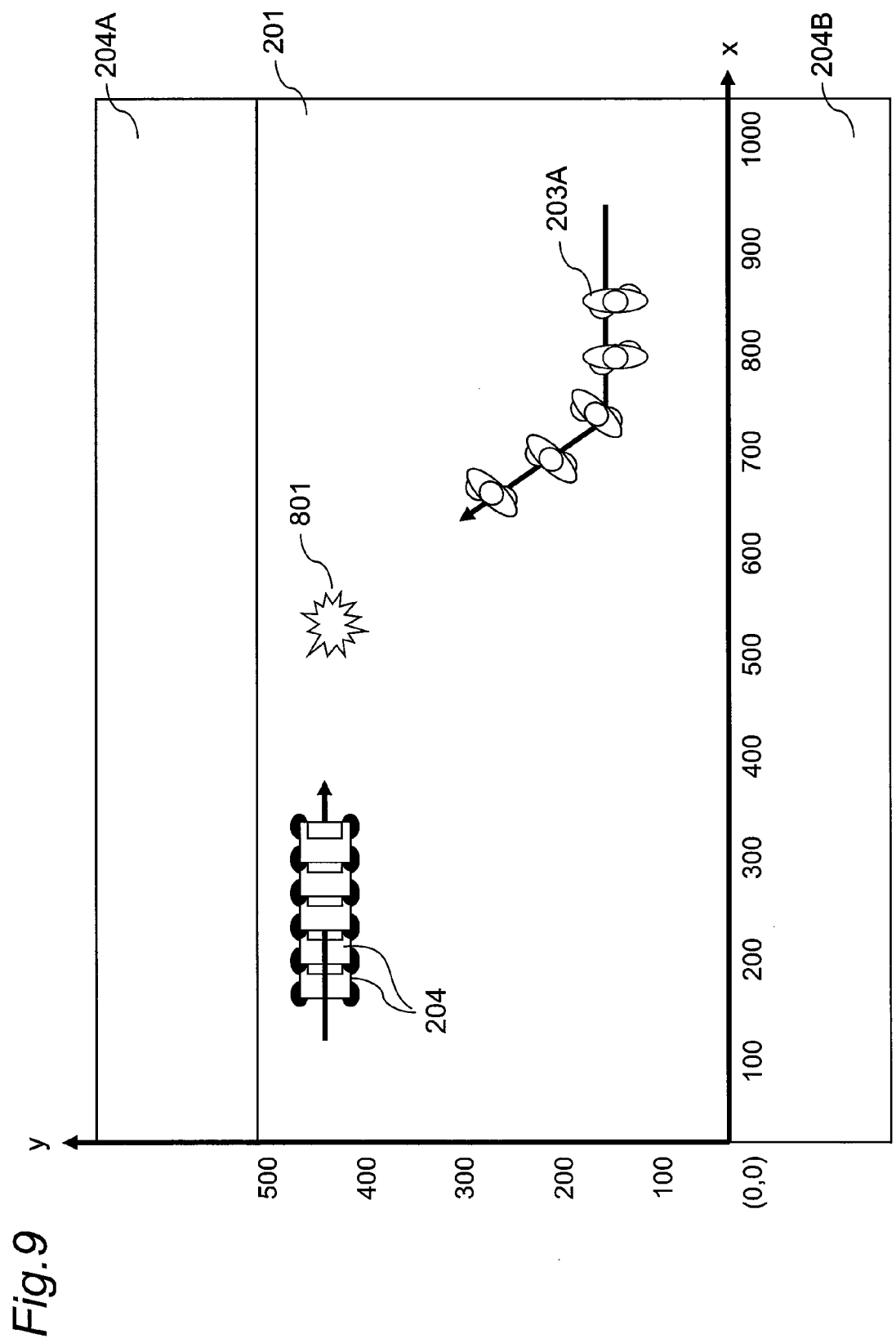
FIG. 9 is a view illustrating one example of a contact state between the person and the robot in the information providing robot according to the first embodiment of the present disclosure.

For example, the person 203 does not contact with the robot 204 under the condition shown in FIG. 2, but as shown in FIG. 9, when the first person 203A changes the direction, the first person 203A is likely to contact with the robot 204 on a contact position 801.

<Description of the Route Generating Unit 108>

The route generating unit 108 is composed of a normal route generating unit 109, the avoiding route generating unit 110, and the access route generating unit 111.

<Description of the Normal Route Generating Unit 109>

When the contact possibility deciding unit 106 decides that the person 203 is unlikely to contact with the robot 204 based on information about the contact possibility decision from the contact possibility deciding unit 106, the normal route generating unit 109 generates a route (normal route) (the third route) of the robot 204 to the desired position or the relay position of the robot 204 according to the position and the moving direction of the robot 204 at the present (at time when necessity of the route generation is decided) based on the running information recorded in the robot database 105. The normal route generated by the normal route generating unit 109 is output to the running controller 112.

A route taken to the desired position or the relay position (hereinafter, described as the desired position) of the robot 204 is generated as the normal route by the normal route generating unit 109 based on the position and the moving direction of the robot 204. Since the robot 204 can arrive at the desired position through only straight-line moving, the robot 204 is turned to the desired position, and then a route for the straight-line moving is generated as the normal route by the normal route generating unit 109.

Since the route generated by the normal route generating unit 109 is a route for the robot 204 to provide information to the person 203 in the environment where the person 203 and the robot 204 coexist, a route generating method based on the straight-line moving that hardly disturb the person 203 is described as an example. However, the route generating method of the robot 204 is not necessarily limited to this, and the route of the robot 204 may be generated by the normal route generating unit 109 by using Dijkstra's algorithm or potential method or the like.

<Description of the Avoiding Route Generating Unit 110>

Further, when the contact possibility deciding unit 106 decides that the contact possibility between the person 203 and the robot 204 is present based on the information about the contact possibility decision from the contact possibility deciding unit 106 and the information about a contact intention decision from the contact intention deciding unit 107, described later, and the contact intention deciding unit 107, described later, cannot decide that the person 203 has the intention to contact with the robot 204, the avoiding route generating unit 110 generates the route (avoiding route) (first route) where the robot 204 avoids the person 203 based on the running information about the robot 204 recorded in the robot database 105 and moving information (the moving direction and the speed) of the person 203 output by the person moving state estimating unit 104. The route generated by the avoiding route generating unit 110 is output to the running controller 112. A signal representing whether an avoiding route is generated is input from the avoiding route generating unit 110 to the contact possibility deciding unit 106.

If the person 203 does not have the intention to contact with the robot 204, when the robot 204 does not change the advancing direction, the robot 204 runs in front of the person 203, and thus the person 203 is made to be change the route. For this reason, when the contact intention deciding unit 107 cannot decide that the person 203 has the intention to contact with the robot 204, the avoiding route generating unit 110 temporarily generates the route where the robot 204 avoids the person 203, and the robot 204 runs along the route generated by the avoiding route generating unit 110 (the running controller 112, described later, controls the running of the robot 204).

On the route where the robot 204 avoids the person 203, the contact between the person 203 and the robot 204 may be avoided not only by the change in the advancing direction of the robot 204 but also a reduction in the speed of the robot 204.

FIG. 8B illustrates one example of the route where the robot 204 avoids the person that is generated by the avoiding route generating unit 110 of the robot 204 in a condition shown in FIG. 8A. In order to prevent the point robot 601 from advancing into the extended region 603, the avoiding route generating unit 110 generates an avoiding route of arrival at a desired position 1601 via a provisional relay position 1603 outside the extended region 603. The provisional relay position 1603 may be set on any position as long as a straight line connecting a current position of the point robot 601 and the provisional relay position 1603, and a straight line connecting the provisional relay position 1603 and the desired position 1601 do not enter the extended region 603. For example, the avoiding route generating unit 110 generates a plurality of candidates of the provisional relay positions randomly, and the avoiding route generating unit 110 may set the provisional relay position candidate which satisfies the above condition and whose distance to the desired position 1601 is the shortest, as the provisional relay position 1603. Further, the extended region 603 in the (x,y,t) three-dimensional configuration space shown in FIG. 8A is regarded as an obstacle, and the avoiding route generating unit 110 may generate a route for making the point robot 601 arrive at the desired position 1601 using the Dijkstra's algorithm or the potential method or the like. The avoiding route generated by the avoiding route generating unit 110 is also regarded as a route where the robot 204 runs in a direction that is different from the running direction of the robot 204 defined by the running information on the normal route so that the route of the person 203 does not cross the route of the robot 204. In other words, the avoiding route generated by the avoiding route generating unit 110 can be regarded as a route where the robot 204 runs in a direction of the position of the person 203 at time of generating the avoiding route estimated by the person moving state estimating unit 104 so that the route of the person 203 does not cross the route of the robot 204.

<Method for Generating the Avoiding Route for Shortening the Time of Contact with the Person 203>

The case where the person 203 has the intention to contact with the robot 204 is examined. Since the robot 204 cannot decide whether the person 203 has the intention to contact with the robot 204, the avoiding route generating unit 110 needs to generate the route where the robot 204 avoids the person 203 until the contact intention deciding unit 107, described later, decides whether the person 203 has the intention to contact with the robot 204.

At this time, when the avoiding route generating unit 110 generates the route where the robot 204 avoids the person 203 by a large margin, the person 203 who has the intention to contact with the robot 204 should greatly change the trajectory in order to catch up with the robot 204.

Figure 10:
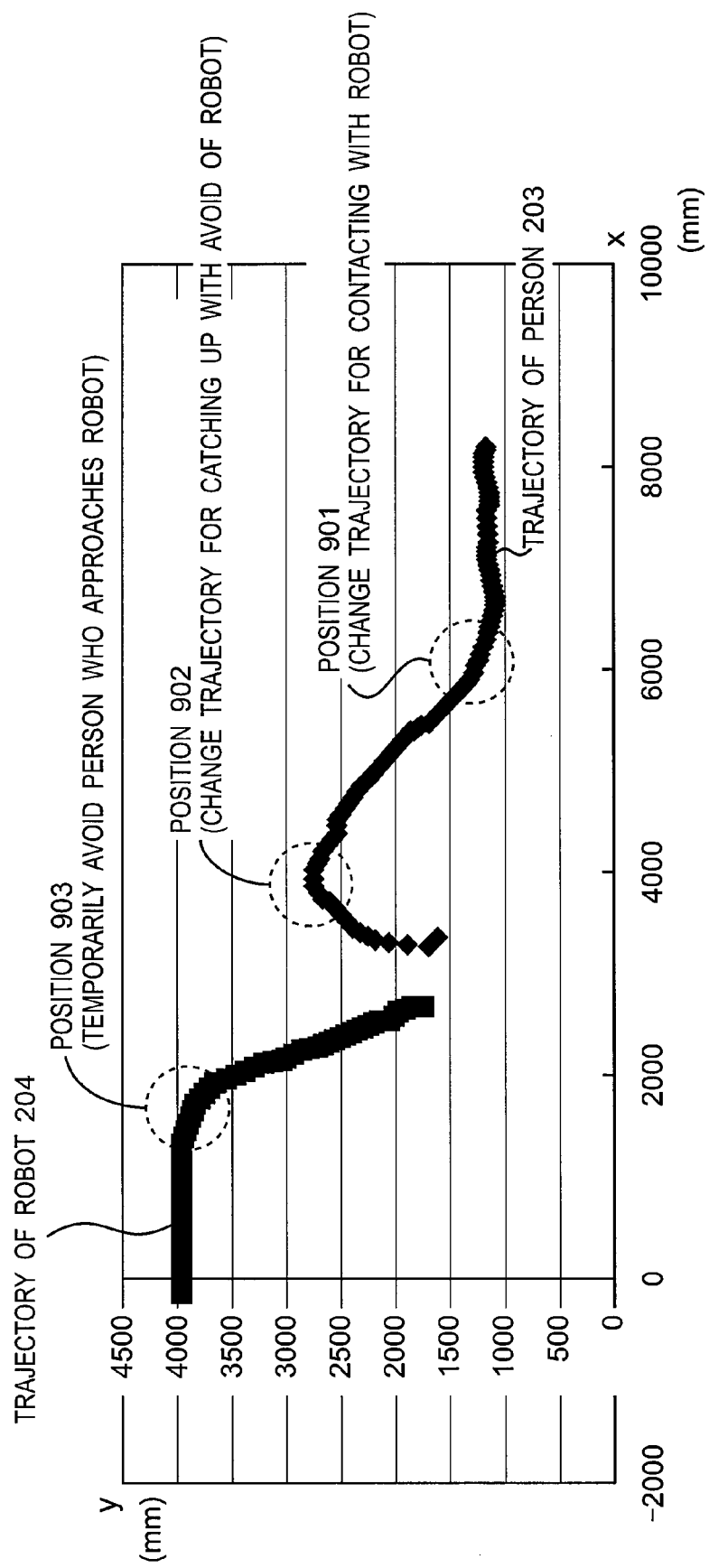
FIG. 10 is a view illustrating one example of the change in the trajectory of the person with respect to the robot avoiding motion of the information providing robot according to the first embodiment of the present disclosure.

FIG. 10 illustrates an actually measured value of a state of the change in the trajectory of the person 203 at the time when the robot 204 avoids the person 203 by a large margin. The person 203 changes a direction on a position 901 of the trajectory of the person 203 in order to contact with the robot 204. The contact possibility deciding unit 106 decides that the robot 204 likely to contact with the person 203 due to the change in the direction by the person 203. As a result, the avoiding route generating unit 110 temporarily generates the route where the robot 204 avoids the person 203 by a large margin on a position 903 of the trajectory of the robot 204, and the robot 204 starts to move along the generated route. Since the robot 204 avoids the person 203 by a large margin, the person 203 having the intention to contact with the robot 204 should change the trajectory by a large margin on a position 902 of the trajectory of the person 203 in order to catch up with the robot 204, and thus has a bad impression of the robot 204.

In view of the above problem, when the robot 204 is avoiding the person 203 but the person 203 has the intention to contact with the robot 204, for example, the avoiding route generating unit 110 can be made to generate the avoiding route where the robot 204 can quickly contact with the person 203.

In the method for generating the avoiding route, for example, the robot 204 is moved straight to the current position of the person 203 that is the desired position. The current position of the person 203 is a position of the person 203 at time when the avoiding route generating unit 110 generates the avoiding route.

Figure 11:
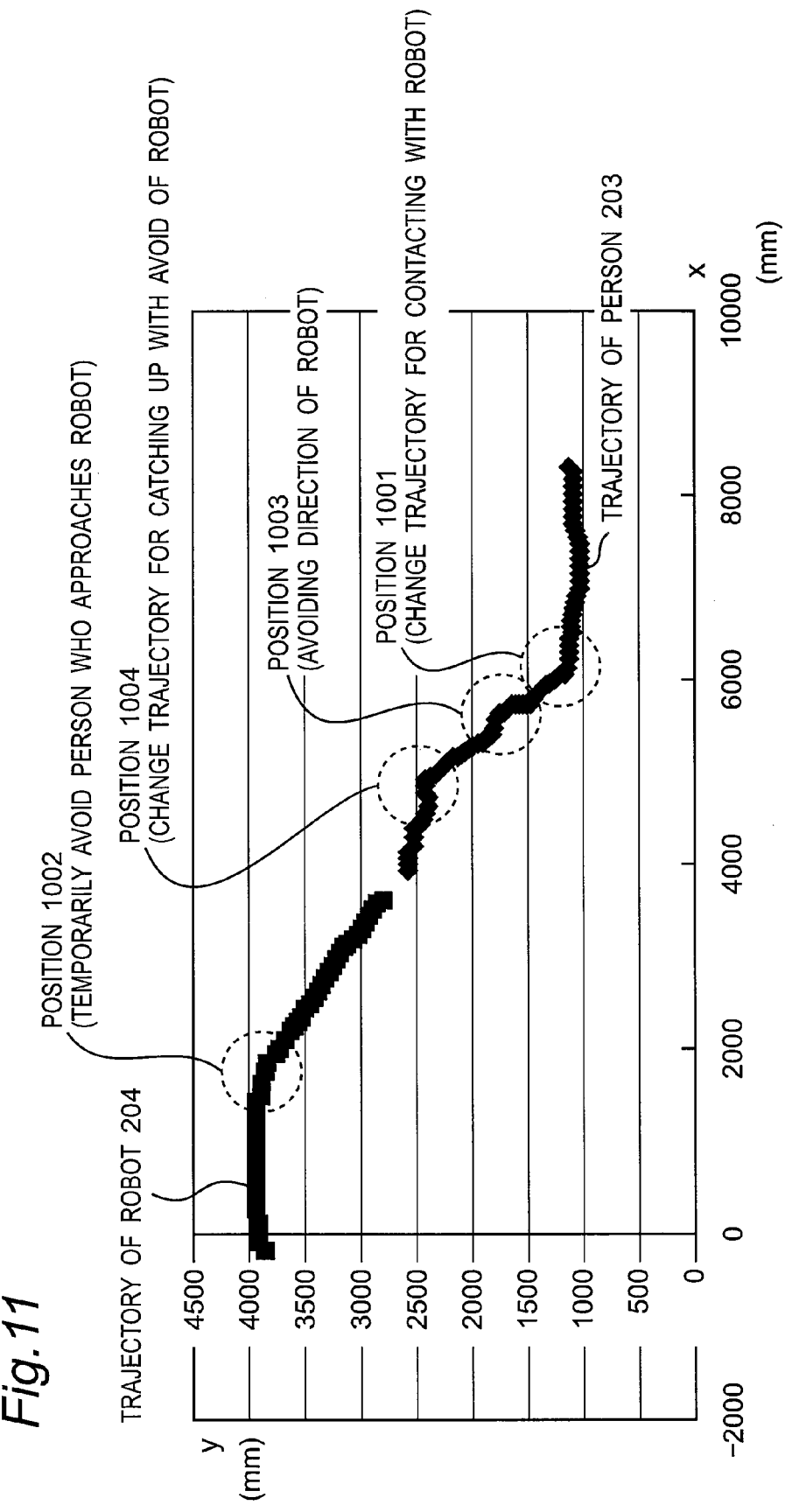
FIG. 11 is a view illustrating one example of the change in the trajectory of the person with respect to the robot avoiding motion of the information providing robot according to the first embodiment of the present disclosure.

FIG. 11 illustrates an actual measured value of the change in the trajectory of the person 203 at time when the robot 204 is moved on the avoiding route. The person 203 changes a direction on a position 1001 of the trajectory of the person 203 in order to contact with the robot 204. The contact possibility deciding unit 106 decides that the robot 204 likely to contact with the person 203 due to the change in the direction by the person 203. As a result, the avoiding route generating unit 110 generates an avoiding route where the robot 204 moves to a position 1003 that is the current position of the person 203 on a position 1002 of the trajectory of the robot 204, and the robot 204 starts to move along the generated route. The person 203 having the intention to contact with the robot 204 can contact with the robot 204 on a position 1004 due to slight change of the trajectory.

When the person 203 and the robot 204 move with them facing each other, namely, the robot 204 cannot avoid the person 203 even if the robot 204 is moved to the position of the person 203 at the time when the avoiding route is generated, for example, the person 203 is assumed to make uniform linear motion as described about the avoiding route generating unit 110, and the avoiding route generating unit 110 may generate a route that does not enter a region occupied by the person 203 in a space to which the time axis (t) is added.

<Method for Detecting the Change in the Trajectory of the Person 203 in Short Time>

A case where the resolution of the image sensor 202 is low, and thus the accuracy of position detection of the person 203 through the image sensor 202 is not satisfactory or the accuracy of the position detection of the person 203 through the image sensor 202 is deteriorated due to a change in an illumination condition is examined. When the accuracy of the position detection of the person 203 is not satisfactory as described above, the slight trajectory change of the person 203 on a position 1004 of the trajectory of the person 203 in FIG. 11 is unlikely to be detected by the image sensor 202. In such a case, the avoiding route generating unit 110 generates the avoiding route where the change in the trajectory of the person 203 is increased, and then, the robot 204 is demanded to employ the generated avoiding route. However, when the change in the trajectory for allowing the robot 204 to follow the avoiding route is large, the person 203 has a bad impression of the robot 204. Therefore, the avoiding route generating unit 110 generates the avoiding route of the robot 204 where the change in the trajectory of the person 203 is the largest within a range where a bad impression is not given to the person 203.

Figure 12:
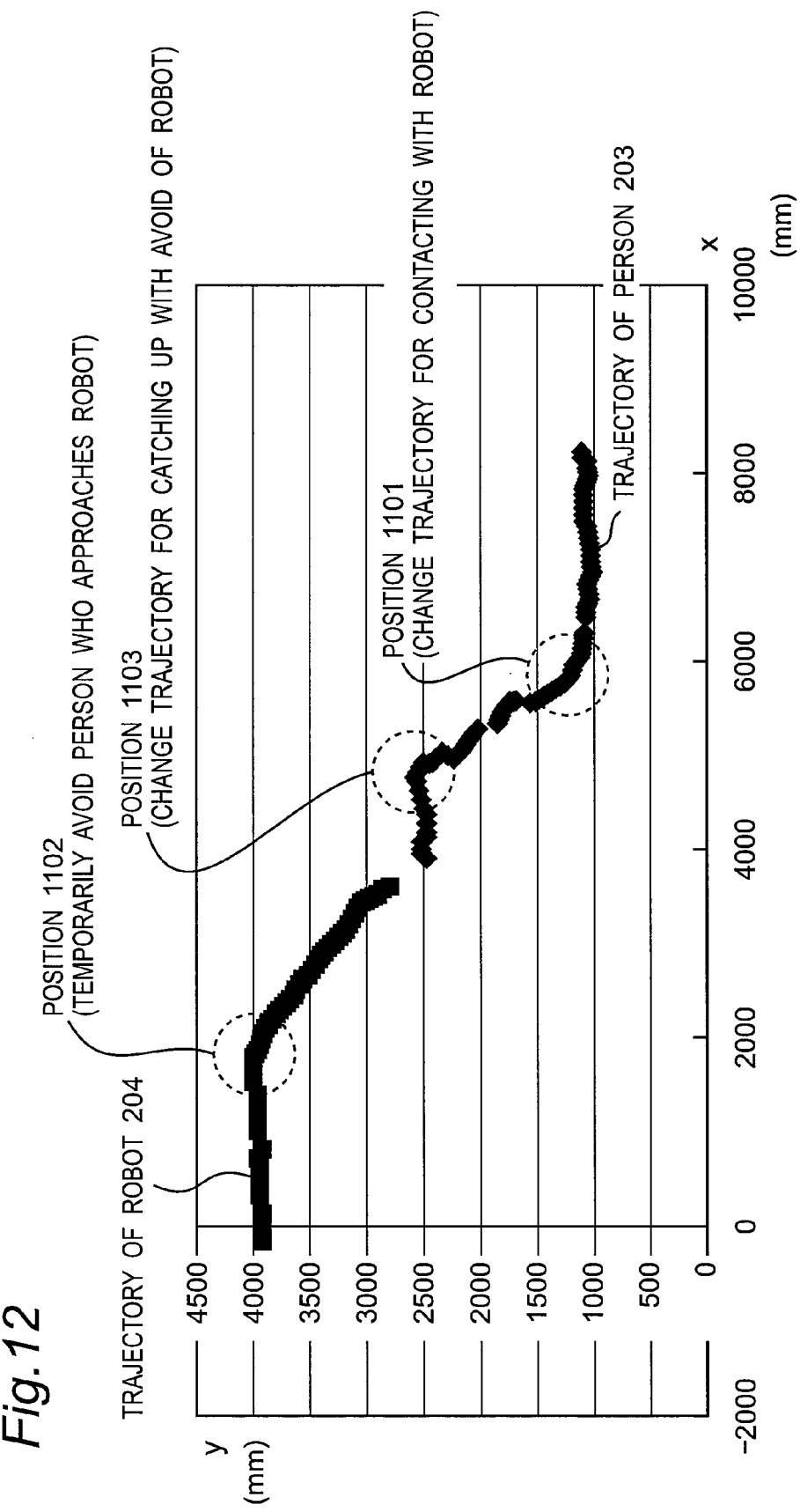
FIG. 12 is a view illustrating one example of the change in the trajectory of the person with respect to the robot avoiding motion of the information providing robot according to the first embodiment of the present disclosure.

FIG. 12 illustrates an actual measured value with which the change in the trajectory of the person 203 is the largest within the range where a bad impression is not given to the person 203. The person 203 changes a direction in order to contact with the robot 204 on a position 1101 of the trajectory of the person 203. The contact possibility deciding unit 106 decides that the robot 204 likely to contact with the person 203 due to the change in the direction by the person 203. As a result, the avoiding route generating unit 110 generates a route where the robot 204 avoids the person 203 on a position 1102 of the trajectory of the robot 204, and the robot 204 starts to move along the generated route. The person 203 having the intention to contact with the robot 204 changes the trajectory on a position 1103 of the trajectory of the person 203 so as to contact with the robot 204.

Figure 13:
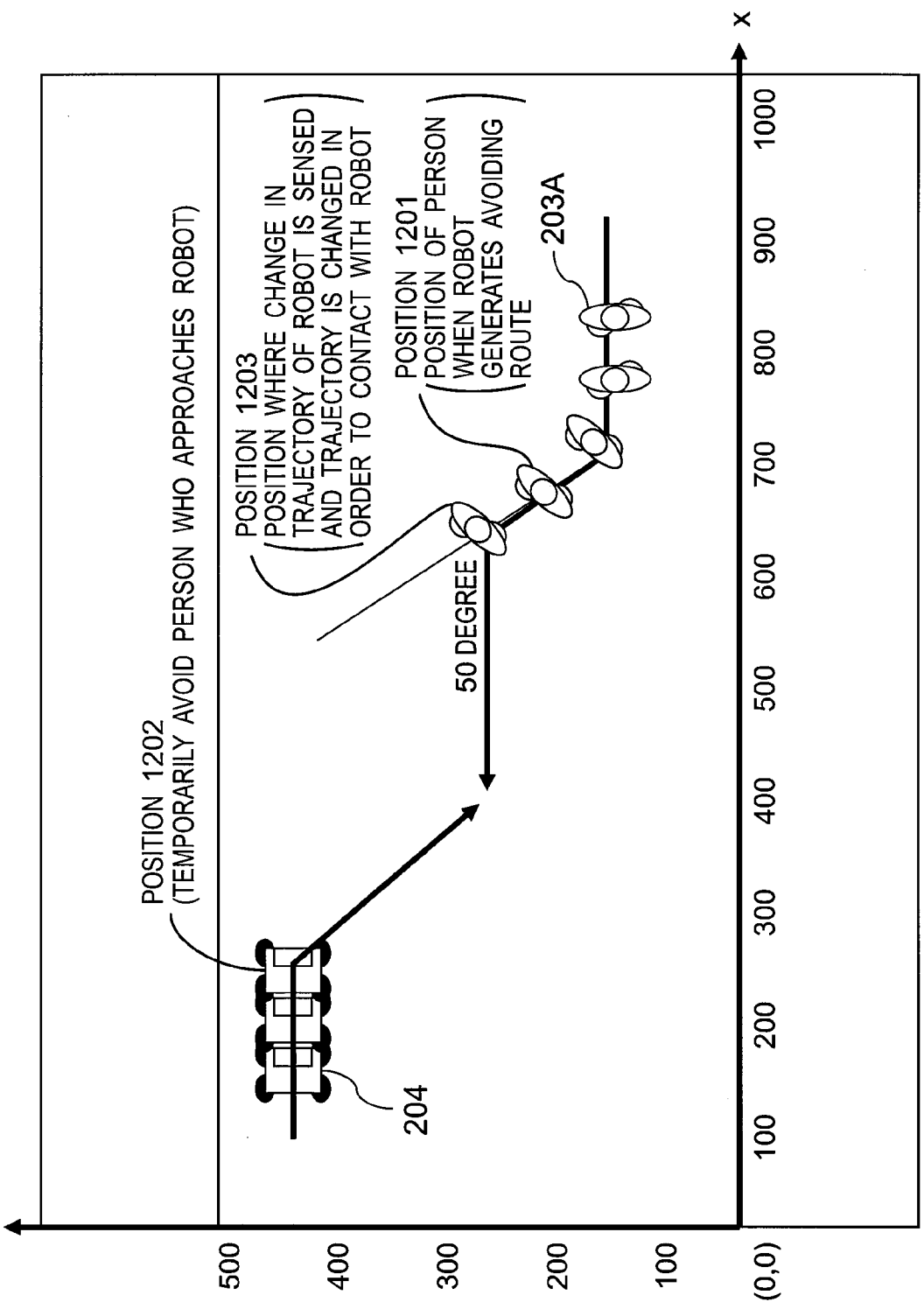
FIG. 13 is a view illustrating one example of generation of the robot avoiding route of the information providing robot according to the first embodiment of the present disclosure.

The concrete method for generating the avoiding route of the robot 204 is described with reference to FIG. 13. The contact possibility deciding unit 106 decides that the robot 204 is likely to contact with the person 203 due to the change in the direction on a position 1201 of the trajectory of the person 203. Perception-reaction time of the person 203 is considered to be 1 second (when a case where the person 203 is an aged person is assumed, the perception-reaction time of the person 203 may be set longer, namely, to 1.5 second).

When a position at a time point when the moving state of the person 203 at present (when necessity of the avoiding route generation is decided) is maintained for 1 second is a position 1203, it can be estimated that the person 203 changes the trajectory on the position 1203 of the trajectory of the person 203 so as to follow the avoiding motion of the robot 204. For this reason, the robot 204 needs to maintain the running on the avoiding route during time obtained by adding the perception-reaction time and time required for detecting the change in the trajectory of the person 203 (emergency stop for avoiding contact between another pedestrian and an obstacle is enabled). For example, at least time required for one walking cycle of the person 203 (for example, 1 second) is secured as the time required for detecting the change in the trajectory of the person 203 (as to the reason for this, see the description about the person moving state estimating unit 104) depending on the performance of the image sensor 202 (the detection position accuracy and an observing cycle of the person 203).

In a survey result, the person 203 does not have a bad impression of the robot 204 in case of the change in the trajectory by, for example, 30° (degrees) to 50° (degrees) (in FIG. 12, an angle of the trajectory change on a position 1103 of the trajectory of the person 203 is about 50°). When the trajectory change is less than 30°, it is difficult to detect whether the person 203 change the trajectory, and thus the trajectory change is 30° or more. Therefore, it is considered that the person 203 turns to the side of the robot 204 by a predetermined angle within a range of 30° to 50° on the position 1203 of the trajectory of the person 203 so as to move (the moving speed is assumed to be maintained at a moving speed at present (at that time)). It is considered that the person 203 takes the above route to move, and the robot 204 may be made to change the trajectory for enabling the contact with the person 203. When the person 203 is a wheelchair user and a load is applied to the direction change, the angle required for the trajectory change for the person 203 to follow the avoiding route of the robot 204 may be set to be less than 50°. The avoiding route generating unit 110 can estimate whether the person 203 is a wheelchair user based on, for example, an image obtained by the image sensor 202 according to the height and the width of the person 203. For example, the width and the depth of the general person 203 are about 60 cm and 20 cm, but the width and the depth of the wheelchair user are 60 cm and 90 cm. So, the person 203 is different from the wheelchair user. The person position estimating unit 102 obtains the width and the depth of the person 203 based on different image information of the person 203 extracted by the background differencing technique, and the avoiding route generating unit 110 can decide whether the general person 203 or the wheelchair user. When the discrimination is made whether the wheelchair or not and a route is then generated, the difference image information of the person 203 is input from the person position estimating unit 102 to the avoiding route generating unit 110.

<Description of the Access Route Generating Unit 111>

Further, when the contact possibility deciding unit 106 decides that the person 203 is likely to contact with the robot 204 based on the information about the contact possibility decision from the contact possibility deciding unit 106 and the information about contact intention decision from the contact intention deciding unit 107, described later, and the contact intention deciding unit 107, described later, decides that the person 203 has the intention to contact with the robot 204, the access route generating unit ill generates a route where the robot 204 approaches the person 203 (access route) (second route) based on the running information about the robot 204 recorded in the robot database 105 and the moving information about the person 203 output from the person moving state estimating unit 104 (the moving direction and the speed). The route generated by the access route generating unit 111 is output to the running controller 112.

The robot 204 generates the route (access route) where the robot 204 approaches the person 203 with the direction at present (at the time of the measurement in the image sensor 202) being maintained. When the robot 204 approaches the person 203, the robot 204 decelerates to stop. When the robot 204 is mounted with a touch panel manipulatable by the person 203, the robot 204 is stopped on a position where the person 203 easily manipulates the touch panel (for example, 1 m is secured as a distance between the person 203 and the robot 204).

<Description of the Contact Intention Deciding Unit 107>

The information estimated by the person moving state estimating unit 104, the information about the route generated by the route generating unit 108, and the information about the contact possibility decision obtained by the route generating unit 108 from the contact possibility deciding unit 106 are input into the contact intention deciding unit 107, the robot 204 runs on the avoiding route based on these information. As a result, when after the robot 204 avoids the person 203, the contact possibility deciding unit 106 again decides that the robot 204 is likely to contact with the person 203 (the person 203 having a person ID identical to the person 203 who is avoided on the avoiding route), it is determined that the person 203 has the intention to contact with the robot 204. The contact intention deciding unit 107 outputs the decided information to the route generating unit 108 (the normal route generating unit 109, the avoiding route generating unit 110, the access route generating unit 111).

<Description of the Running Controller 112>

The running controller 112 functions as one example of an autonomous running controller, and is composed of, for example, the speed command value converting unit 113 and a wheel controller 114, and controls the running of the robot 204 based on the route generated by the route generating unit 108.

The speed command value converting unit 113 calculates a speed command value of the robot 204 based on the route generated by the route generating unit 108. The speed command value is a value for determining a direction (forward rotation or reverse rotation) and a speed to and at which each wheel is rotated when the robot 204 moves with two wheels. As a concrete example, each wheel is driven to be rotated forward and reverse by a motor, and an encoder detects a rotary angle of the motor, and the speed command value converting unit 113 calculates a rotating direction and a rotating speed of each wheel as the speed command values based on the detected rotary angle. The calculated speed command values are output from the speed command value converting unit 113 to the wheel controller 114.

The wheel controller 114 controls the rotation of each wheel of the robot 204 based on the speed command values (the rotating direction and the rotating speed of each wheel) calculated by the speed command value converting unit 113.

When the speed command value converting unit 113 estimates a self position of the robot 204 using odometry, the self position estimated by the speed command value converting unit 113 is recorded from the speed command value converting unit 113 into the robot database 105 based on the odometry.

<Description of Flowchart>

Figure 14:
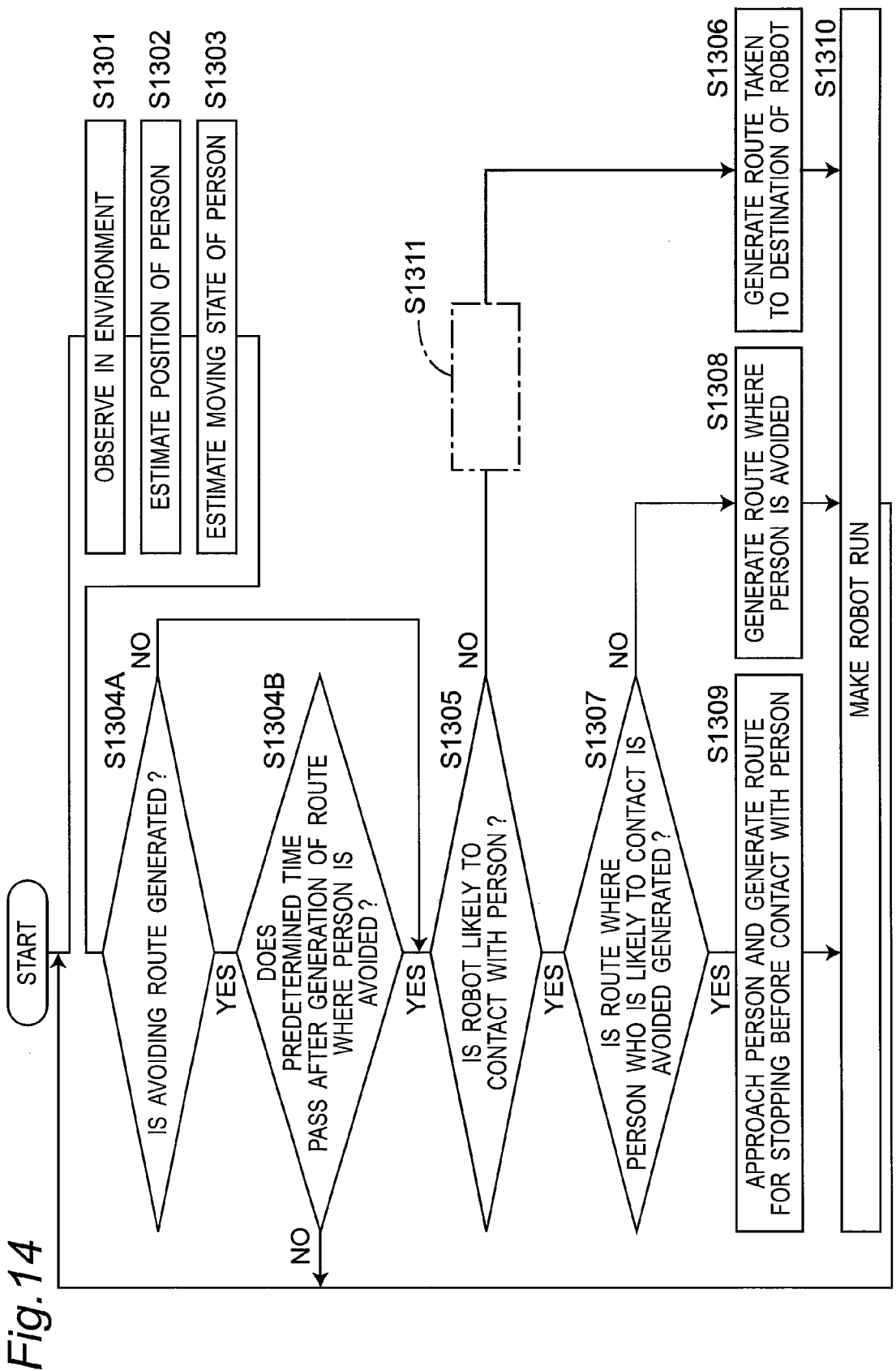
FIG. 14 is a flowchart illustrating an entire process of the information providing robot according to the first embodiment of the present disclosure.

The motions of the respective components are described below with reference to the flowchart in FIG. 14.

At step S1301, the image sensor 202 that is one example of the observing apparatus 101 observes the person 203 and the robot 204 that are present within the passage 201 that is an observing range of the image sensor 202 at a predetermined observing cycle (for example, 100 msec), and then, obtain an image. After the obtained image information is output as the observed value to the person position estimating unit 102, the sequence goes to step S1302.

At step S1302, the person position estimating unit 102 estimates the position of a mobile object (person) that is present in the observing range of the observing apparatus 101 based on the observed value obtained by the observing apparatus 101. After the estimated position of the mobile object is output from the person position estimating unit 102 to the person position history database 103, the sequence goes to step S1303.

When the observing apparatus 101 is the image sensor 202, for example, the position of the mobile object is estimated by the person position estimating unit 102 using the background differencing technique so as to be capable of being recorded in the person position history database 103. Since details of the background differencing technique are described above, description of this is omitted.

At step S1303, the person moving state estimating unit 104 estimates the moving state (the moving direction and the moving speed) of the person 203 having each person ID at present (time when the image sensor 202 obtains the latest image) based on the position history of each person ID recorded in the person position history database 103. The estimated information is output from the person moving state estimating unit 104 to the contact possibility deciding unit 106 and the contact intention deciding unit 107. Thereafter, the sequence goes to step S1304A. The current position of the person 203 is the latest position recorded in the person position history database 103.

The contact possibility deciding unit 106 decides whether the avoiding route is already generated by the avoiding route generating unit 110 at step S1304A. When the contact possibility deciding unit 106 decides that the avoiding route is already generated by the avoiding route generating unit 110, the sequence goes to step S1304B. When the contact possibility deciding unit 106 decides that the avoiding route is not generated by the avoiding route generating unit 110, the sequence goes to step S1305.

After the avoiding route generating unit 110 generates the avoiding route of the robot 204 where the robot 204 avoids the person 203, the contact possibility deciding unit 106 decides whether predetermined time (for example, about 1 second) passes at step S1304B. When the predetermined time passes, the sequence goes to step S1305, and when the predetermined time does not pass, the sequence returns to step S1301. The decision is made whether the predetermined time passes in order to secure time during which a determination is made whether the person 203 performs the following motion with respect to the avoiding motion of the robot 204 after the avoiding route of the robot 204 where the robot 204 avoids the person 203 is generated by the avoiding route generating unit 110 and the robot 204 runs along the avoiding route.

The contact possibility deciding unit 106 decides whether the person 203 is likely to contact with the robot 204 based on the moving state of the person 203 input from the person moving state estimating unit 104, and the moving state of the robot 204 obtained from the robot database 105 at step S1305. When the contact possibility deciding unit 106 decides that the person 203 is likely to contact with the robot 204, the sequence goes to step S1307, and when the contact possibility deciding unit 106 decides that the person 203 is unlikely to contact with the robot 204, the sequence goes to step S1306.

At step S1306, since the contact possibility deciding unit 106 decides that the person 203 is unlikely to contact with the robot 204 based on the information about the contact possibility decision from the contact possibility deciding unit 106, the normal route generating unit 109 generates a normal route leading to the desired position or the relay position of the robot 204 (hereinafter, simply described as the desired position) at present based on the position and the moving direction of the robot 204 at present (at time of observation in the image sensor 202). After the normal route generated by the normal route generating unit 109 is output to the running controller 112, the sequence goes to step S1310.

In the above description, when the avoiding route is generated and the robot 204 moves along the avoiding route (see step S1304A to step S1304B), and the decision is made at step S1305 that the contact possibility is not present, the robot 204 generates the normal route so as to move along the normal route. Instead of this, as another example, when the decision is made at step S1305 that the contact possibility is not present, the moving along the avoiding route is continued until the contact possibility deciding unit 106 decides at step S1311 that second predetermined time longer than the predetermined time of step S1304B passes (for example, time until the avoiding motion is completed may be set. In another manner, predetermined time such as 30 seconds may be set). After the second predetermined time passes, the sequence goes to step S1306, and a normal route is generated at step S1306 so that the robot 204 may move along the normal route. As a result, the robot 204 can securely advances along the avoiding route for the second predetermined time, and during this time, the robot 204 can make the avoiding motion with respect to the person 203. As a result, after passing of time when the avoiding motion is assumed to be completed without executing a complicated deciding process for deciding whether the avoiding motion is actually completed by using the sensor, the normal route is generated, so that the moving motion along the normal route can be made, and thus a false motion for returning again to the normal route before the avoiding motion is completed can be prevented and the process can be simplified. This modified example can be applied also to a second embodiment, described later.

At step S1307, the contact intention deciding unit 107 decides whether the person 203 has the intention to contact with the robot 204 based on the information estimated by the person moving state estimating unit 104, the information about the route generated by the route generating unit 108, and the information about the contact possibility decision obtained by the route generating unit 108 from the contact possibility deciding unit 106. Concretely, the contact intention deciding unit 107 decides whether the route generating unit 108 already generates the avoiding route based on these information. When the contact intention deciding unit 107 decides that the avoiding route is already generated, the person 203 (the person 203 who has the same person ID as the person 203 who takes the avoiding route) is again likely to contact with the robot 204 although the robot 204 runs on the avoiding route, and the contact intention deciding unit 107 can decide that the person 203 (the person 203 who has the same person ID as the person 203 who takes the avoiding route) has the intention to contact with the robot 204. In this case, after the information about the decision is output from the contact intention deciding unit 107 to the avoiding route generating unit 110, the sequence goes to step S1309.

When the contact intention deciding unit 107 decides that the avoiding route is not generated, the robot 204 runs along the normal route, and the person 203 is likely to contact with the robot 204 at step S1307, and thus the contact intention deciding unit 107 cannot decide that the person 203 has the intention to contact with the robot 204. In this case, in order to generate the avoiding route, the decision information from the contact intention deciding unit 107 is output to the avoiding route generating unit 110, and then the sequence goes to step S1308.

When the contact possibility deciding unit 106 decides that the person 203 is likely to contact with the robot 204, and the contact intention deciding unit 107, described later, cannot decide that the person 203 has the intention to contact with the robot 204, the avoiding route generating unit 110 generates the avoiding route of the robot 204 at step S1308. After the generated avoiding route is output from the avoiding route generating unit 110 to the running controller 112, the sequence goes to S1310.

If the person 203 does not have the intention to contact with the robot 204, when the robot 204 does not change the advancing direction, the robot 204 runs in front of the person 203, and thus the person 203 is made to be change the route. For this reason, when the decision cannot be made whether the person 203 has the intention to contact with the robot 204, the avoiding route generating unit 110 temporarily generates the avoiding route where the robot 204 avoids the person 203, and the robot 204 runs along the route generated by the avoiding route generating unit 110 under the control of the running controller 112 at S1310.

When the contact possibility deciding unit 106 decides that the person 203 is likely to contact with the robot 204, and the contact intention deciding unit 107, described later, decides that the person 203 has the intention to contact with the robot 204, the avoiding route generating unit 111 generates the contact route of the robot 204 at step S1309. After the route generated by the access route generating unit 111 is output to the running controller 112, the sequence goes to step S1310.

The access route generating unit 111 generates the access route for approaching the person 203 at least during time until the person 203 recognizes a change in the moving direction of the robot 204 with the robot 204 maintaining the direction at present (when the necessity of the access route is determined). When the robot 204 approaches the person 203, the robot 204 decelerates to stop. When a touch panel manipulatable by the person 203 is mounted, the robot 204 is stopped on a position where the person 203 easily manipulates the touch panel (for example, 1 m is secured as a distance between the person 203 and the robot 204) under the control of the running controller 112.

The speed command value converting unit 113 included in the running controller 112 calculates the speed command values of the robot 204 based on the route generated by the route generating unit 108 at step S1310. The wheel controller 114 controls each wheel of the robot 204 based on the speed command values calculated by the speed command value converting unit 113, namely, the rotating direction and the rotating speed of each wheel. Thereafter, the sequence goes to step S1301.

According to the first embodiment, even when the person 203 who moves towards the robot 204 is estimated by the person moving state estimating unit 104, the person 203 does not necessarily have the intention to contact with the robot 204, and thus the avoiding route generating unit 110 temporarily generates the avoiding route where the robot 204 avoids the person 203, so that the running controller 112 makes the avoiding motion. As a result, the contact intention deciding unit 107 can decide whether the person 203 who changes a trajectory according to the avoiding motion of the robot 204 is the person 203 who truly has the intention to contact with the robot 204. As a result, since the robot 204 makes the avoiding motion with respect to the person 203 who does not have the intention to contact with the robot 204, a danger of the contact is eliminated, and thus the motion does not trouble the person 203. The contact intention deciding unit 107 decides whether the person 203 has the intention to contact with the robot 204 based on the later change in the trajectory of the person 203 who has the intention to contact with the robot 204, and the robot 204 is made to contact with the person 203 smoothly, so that the robot 204 can provide information to the person 203.

Second Embodiment

In an autonomous running control device 200B of an information providing robot according to the second embodiment of the present disclosure, an intention of the person 203 to contact with the robot 204 can be decided in consideration of information about an environment where a person 203 and a robot 204 coexist. Such an example is described below.

Figure 15:
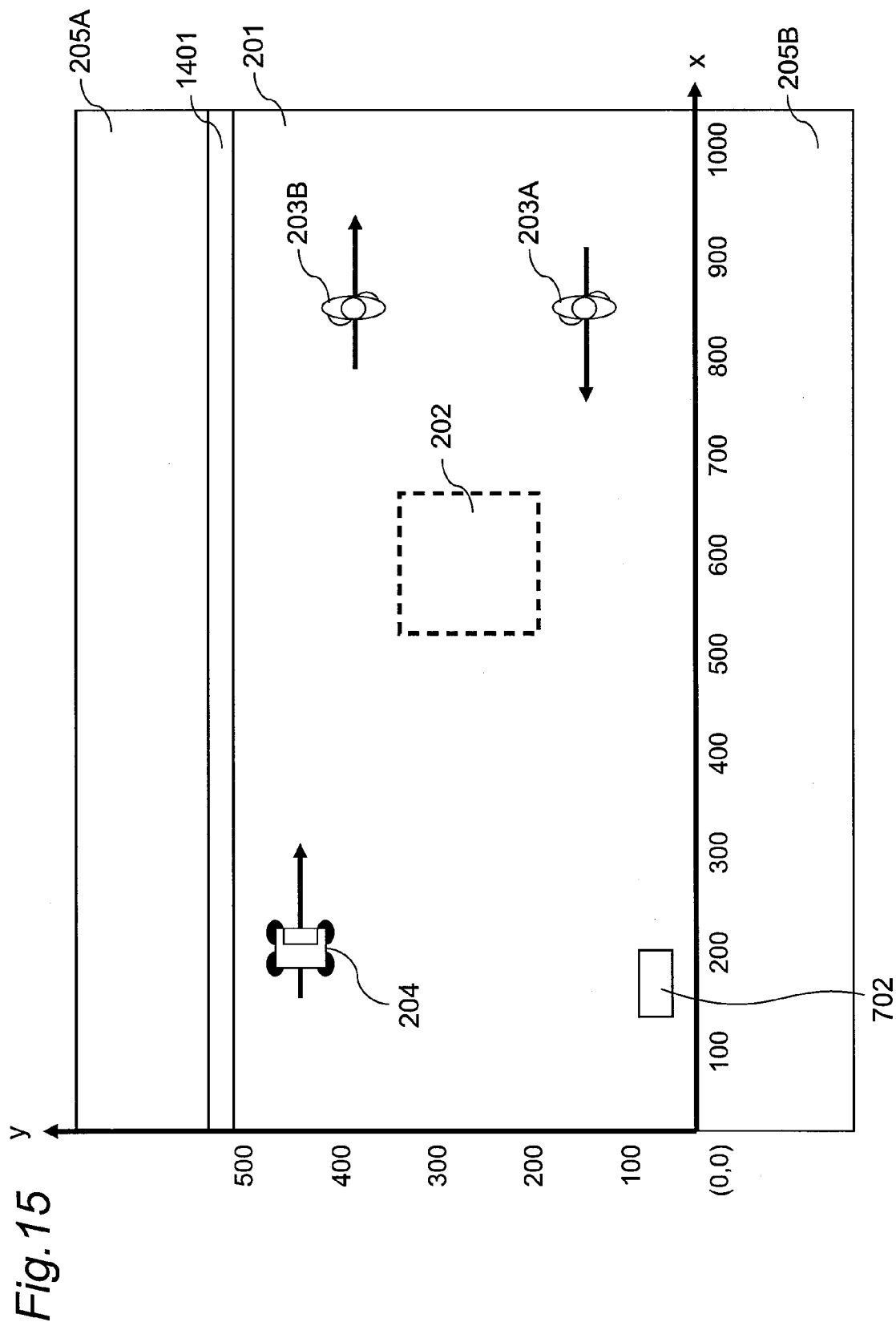
FIG. 15 is a view illustrating one example of a passage in a commercial facility where an information providing robot according to a second embodiment of the present disclosure operates.

FIG. 15 illustrates one example of one section of the commercial facility shown in FIG. 2 at 19:30 corresponding to one example of time after shops are closed.

In the example of FIG. 15, since a first shop 205A is closed, a shutter 1401 is closed.

Figure 17:
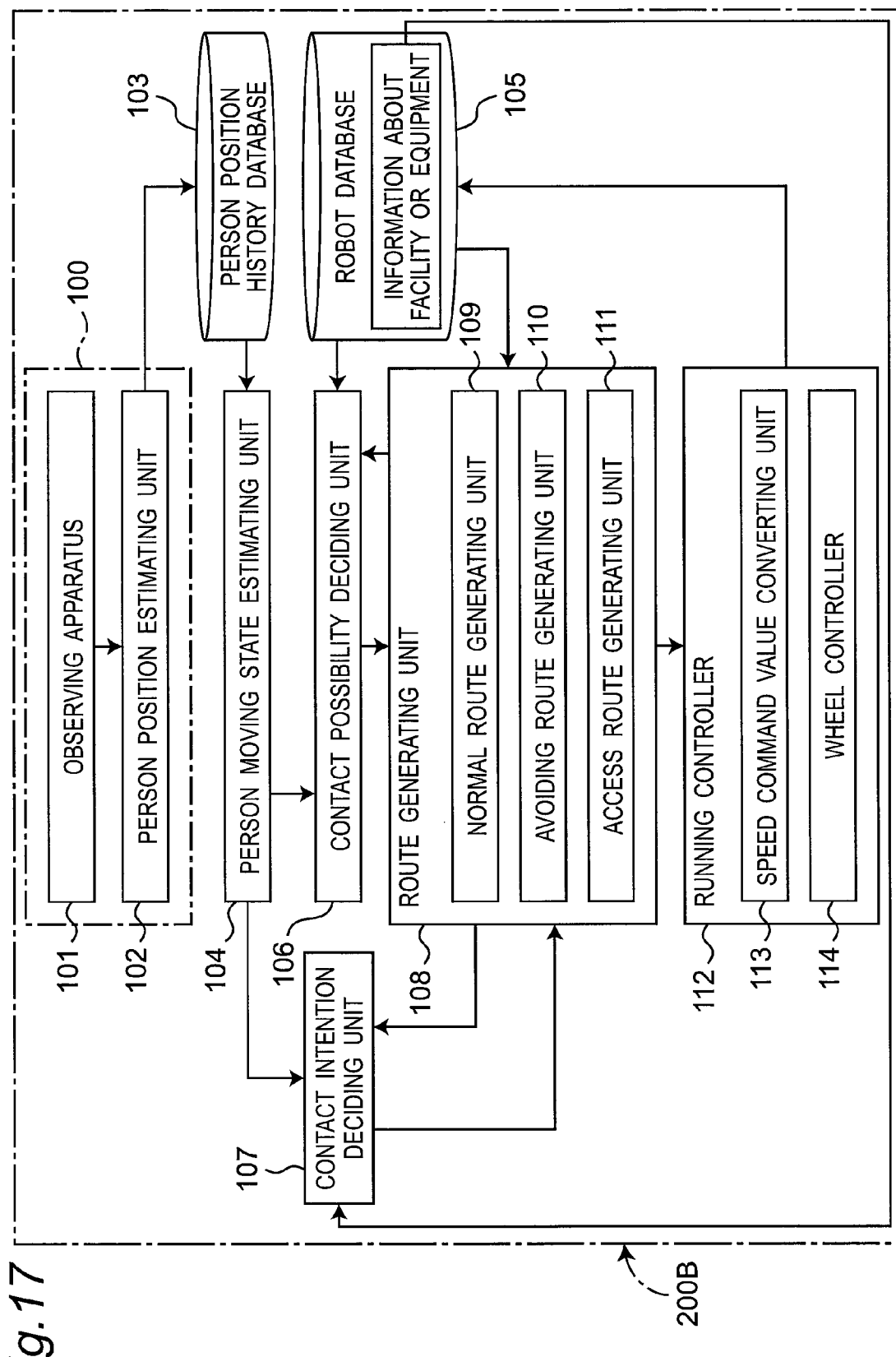
FIG. 17 is a block diagram illustrating a constitution of the information providing robot according to the second embodiment of the present disclosure.

FIG. 17 is a block diagram illustrating a constitution of the autonomous running control device 200B of the information providing robot according to the second embodiment. A different point of the autonomous running control device 200B from the autonomous running control device 200 in the first embodiment is that equipment and facility data is recorded as a part of a robot database 105, and a contact intention deciding unit 107 obtains the equipment and facility data in the robot database 105.

FIG. 16 illustrates an example of the equipment and facility data recorded as a part of the robot database 105. Shop data of shops as facilities in the commercial facility (information about opening hours and position coordinates of the shops), and data of chairs as equipment (information about utilization times and position coordinates of the chairs) are recorded in the equipment and facility data (information about facility or equipment) shown in FIG. 16. Concretely, the utilization times are determined for the facility and equipment, and shop hours of shops 205A-205C are recorded as the utilization times. Further, chairs 702A-702C can be utilized for 24 hours. Further, data of a region occupied by each facility or equipment is recorded in the equipment and facility data. For example, the first shop 205A occupies a rectangular region where two points indicated by coordinates (0,1000) and (1000,500) are diagonal points.

In the above situation, a first person 203A changes a trajectory and moves towards the robot 204. In the situation shown in FIG. 2, it can be considered that the first person 203A is likely to change a trajectory in order to enter the opening first shop 205A, but in the situation shown in FIG. 15, the first shop 205A is close, and the chair 702 for the first person 203A to take a break is not present in a moving direction of the first person 203A. Further, since another person 203 is not present in the moving direction of the first person 203A, a decision can be made that the first person 203A is highly likely to have an intention to contact with the robot 204. In such a case, the robot 204 may generate an access route for approaching the first person 203A without temporarily generating an avoiding route where the robot 204 avoids the first person 203A in a route generating unit 108.

A concrete processing method of the above motion in the autonomous running control device 200B is described. The contact intention deciding unit 107 refers to the robot database 105, and extracts the information about the facility or equipment usable at current time. When the region occupied by the extracted facility or equipment is present in the moving direction of the first person 203A, the contact intention deciding unit 107 decides that the first person 203A is likely to use the facility or equipment based on the extracted information about the facility or equipment. Further, when another person 203 is present in the moving direction of the first person 203A, the contact intention deciding unit 107 decides that the first person 203A is likely to contact with another person 203 based on a moving state of the person 203 output from the person moving state estimating unit 104. The decision whether the shop (or an opening shop) 205 or another the person 203 is present in the advancing direction of the first person 203A in the contact intention deciding unit 107 can be realized by using a method equivalent to the decision of contact possibility between the robot 204 and the person 203. When the contact intention deciding unit 107 decides that the first person 203A is likely to contact with the facility or equipment, the contact intention deciding unit 107 decides that the first person 203A is likely to use the facility or equipment. Similarly when the contact intention deciding unit 107 decides that the first person 203A is likely to contact with another person 203, the contact intention deciding unit 107 decides that the first person 203A is likely to move in order to contact with another person 203.

When the contact intention deciding unit 107 decides that the first person 203A is likely to contact with the facility or equipment, or another person 203, the first person 203A is likely to have no intention to contact with the robot 204, the avoiding route generating unit 110 temporarily generates an avoiding route where the robot 204 avoids the first person 203A. Further, when the contact intention deciding unit 107 decides that the first person 203A is unlikely to contact with the facility or equipment and another person 203, and the contact intention deciding unit 107 decides that the first person 203A is likely to have the intention to contact with the robot 204, the robot 204 generates an access route for approaching the person 203 in the access route generating unit 111.

Figure 18:
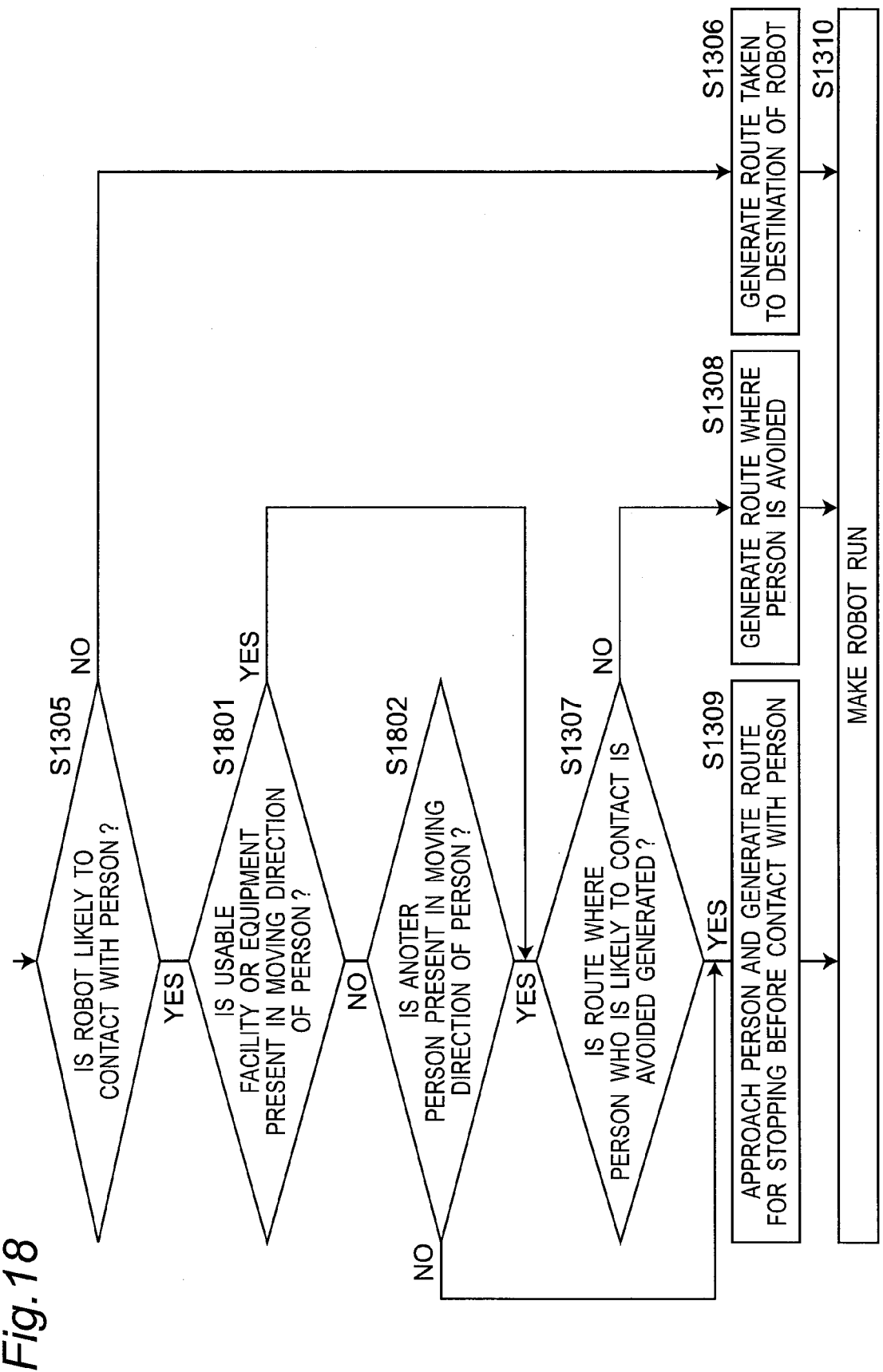
FIG. 18 is a flowchart partially illustrating the process of the information providing robot according to the second embodiment of the present disclosure.

The motions of the respective components are described below with reference to a flowchart in FIG. 18. Since step S1301 to step S1304B are the same as those in FIG. 14, the illustration of them is omitted. Further, in FIG. 17, since details of the steps other than step S1801 and step S1802 are equivalent to the contents described with reference to FIG. 14, description thereof is omitted.

The contact intention deciding unit 107 refers to the robot database 105, and decides whether facility or equipment usable by the first person 203A is present in the moving direction of the first person 203A at step S1801. When the contact intention deciding unit 107 decides that facility or equipment usable by the first person 203A is present in the moving direction of the first person 203A, the sequence goes to step S1307. On the other hand, when the contact intention deciding unit 107 decides that facility or equipment usable by the first person 203A is not present in the moving direction of the first person 203A, the sequence goes to step S1802.

The contact intention deciding unit 107 decides whether another person 203 is present in the moving direction of the first person 203A based on the moving state of the person 203 output from the person moving state estimating unit 104 at step S1802. When the contact intention deciding unit 107 decides that another person 203 is present in the moving direction of the first person 203A, the sequence goes to step S1307. On the other hand, when the contact intention deciding unit 107 decides that another person 203 is not present in the moving direction of the first person 203A, the sequence goes to step S1309.

According to the second embodiment, in addition to the effect of the first embodiment, when the shop 205 is not present in the moving direction of the person 203 at present (at time of observation in the image sensor 202) or the shop 205 present in the current moving direction of the person 203 is outside business hours, even if the intention of the person 203 to contact with the robot 204 cannot be decided, the access route generating unit 111 can generate the access route for approaching the person 203.

The present disclosure is not limited to the above embodiments, and can be carried out in another various forms.

For example, after the access route is generated by the access route generating unit 111, the contact intention deciding unit 107 may again decide whether the person 203 approaches the robot 204. In such a manner, the intention of the person 203 can be again checked by the contact intention deciding unit 107, and although the person 203 does not have the intention to approach the robot 204, a detection is made that the person 203 almost approaches the robot 204 wrongly, so that a wrong decision that the person 203 approaches the robot 204 can be eliminated.

Further, when the contact possibility deciding unit 106 makes the contact possibility decision, a decision may be made whether the person 203 contacts with the robot 204 according to whether the route of the person 203 and the route of the robot 204 cross each other. At this time, the avoiding route generating unit 110 generates a route where the route of the person 203 does not cross the route of the robot 204 as the avoiding route where the robot 204 avoids the person 203. On the other hand, the access route generating unit 111 generates the route where the route of the person 203 crosses the route of the robot 204 as the access route where the robot 204 approaches the person 203.

Though the present disclosure has been described above based on the above first to second embodiments and modification examples, the present disclosure should not be limited to the above-described first to second embodiments and modification examples. For example, the present disclosure also includes the following cases.

Part or entirety of each of the above-described control devices is actually a computer system that includes, for example, a microprocessor, ROM, RAM, hard disk unit, display unit, keyboard, mouse, and the like. A computer program is stored on the RAM or the hard disk unit. Functions of each of the control devices can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the control devices according to each of the above-mentioned embodiments and modification examples is a following program. That is to say, this program has a computer execute the sections (parts/units) defined in claims. The program has a computer execute the units/steps defined in claims. That is, such a program is a program for an autonomous running control device of an autonomous running apparatus for changing a running route of the autonomous running apparatus according to a motion of a person with respect to the autonomous running apparatus running towards a destination given in advance, the program making a computer function as:

an avoiding route generating unit that generates a first route where the autonomous running apparatus avoids the person when the person is likely to contact with the autonomous running apparatus according to a position history of the person for predetermined time;

a contact intention deciding unit that decides whether the person has an intention to approach the autonomous running apparatus when the autonomous running apparatus runs along the first route generated by the avoiding route generating unit;

an access route generating unit that generates a second route where the autonomous running apparatus approaches the person when the contact intention deciding unit decides that the person has the intention to approach the autonomous running apparatus; and an autonomous running controller that controls running of the autonomous running apparatus along the first route or the second route.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

The entire disclosure of Japanese Patent Application No.: 2013-058646 filed on Mar. 21, 2013, including specification, claims, drawings, and summary are incorporated herein by reference in its entirety.

INDUSTRIAL APPLICABILITY

In the method and device for controlling autonomous running of the autonomous running apparatus, and the program for the autonomous running control device of the present disclosure, even when a person who goes towards the autonomous running apparatus is detected, in consideration of that the person does not always have the intention to contact with the autonomous running apparatus, the motion for avoiding the person is temporarily made. As a result, the decision can be made that the person who changes a trajectory to follow the avoiding motion of the autonomous running apparatus truly has the intention to contact with the autonomous running apparatus. As a result, since the autonomous running apparatus makes the avoiding motion for a person who does not have the intention to contact with the autonomous running apparatus, there is no danger of contact, and the motion that does not trouble the person is made. Further, the decision is made whether the person, who has the intention to contact with the autonomous running apparatus, has the intention to contact with the autonomous running apparatus according to the later change in the trajectory of the person, so that the contact with the person is smoothly performed and information can be provided. Therefore, the present disclosure can be useful particularly for the autonomous running control method and device for the autonomous running apparatus, and the program for the autonomous running control device in large-scale commercial facilities or tourist facilities or hospitals where persons are considered to frequently demand the information from the autonomous running apparatus.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An autonomous running control method of an autonomous running apparatus for changing a running route of the autonomous running apparatus according to a motion of a person with respect to the autonomous running apparatus that runs towards a destination given in advance, the method comprising:
    controlling running of the autonomous running apparatus along a first route where an autonomous running controller avoids the person when the person is likely to contact with the autonomous running apparatus according to a position history of the person for predetermined time;
    deciding whether the person has an intention to approach and make contact the autonomous running apparatus in a contact intention deciding unit after the autonomous running apparatus runs along the first route;
    generating a second route where the autonomous running apparatus approaches the person in an access route generating unit when decision is made that the person has the intention to approach and make contact with the autonomous running apparatus; and
    controlling the running of the autonomous running apparatus along the second route in the autonomous running controller so that the autonomous running apparatus makes contact with the person.

2. The autonomous running control method of the autonomous running apparatus according to claim 1, wherein
    the decision whether the person is likely to contact with the autonomous running apparatus is made by:
    estimating a moving direction and a moving speed of the person based on the position history of the person for the predetermined time in a person moving state estimating unit; and deciding whether the person is likely to contact with the autonomous running apparatus in a contact possibility deciding unit based on the moving direction and the moving speed of the person estimated by the person moving state estimating unit and running information about running of the autonomous running apparatus from a first position to a second position.

3. The autonomous running control method of the autonomous running apparatus according to claim 2, wherein
when the contact possibility deciding unit decides that the contact is likely to be made, an avoiding route generating unit generates the first route.

4. The autonomous running control method of the autonomous running apparatus according to claim 3, wherein
after the autonomous running apparatus runs along the first route, the contact intention deciding unit decides whether the person has the intention to approach the autonomous running apparatus based on decision in the contact possibility deciding unit.

5. The autonomous running control method of the autonomous running apparatus according to claim 4, wherein
when the contact possibility deciding unit decides that the contact is unlikely to be made, a normal route generating unit generates a third route for moving to the destination,
the autonomous running controller controls the running of the autonomous running apparatus along the third route.

6. The autonomous running control method of the autonomous running apparatus according to claim 5, wherein
when the contact possibility deciding unit decides that the autonomous running apparatus is likely to contact with the person, and the contact intention deciding unit does not decide that the person has the intention to approach the autonomous running apparatus, the autonomous running controller controls the running of the autonomous running apparatus along the first route.

7. The autonomous running control method of autonomous running apparatus according to claim 6, wherein
the first route generated by the avoiding route generating unit is a route which avoids a region where the person moves based on the moving direction and moving speed of the person estimated by the person moving state estimating unit and where the autonomous running apparatus runs so that a route of the person and a route of the autonomous running apparatus do not cross each other.

8. The autonomous running control method of the autonomous running apparatus according to claim 7, wherein
the first route generated by the avoiding route generating unit is a route where the autonomous running apparatus runs to a direction of a position of the person at time when the first route to be estimated by the person moving state estimating unit is generated so that the route of the person and the route of the autonomous running apparatus do not cross each other.

9. The autonomous running control method of the autonomous running apparatus according to claim 6, wherein
after the autonomous running apparatus starts to run along the second route generated by the avoiding route generating unit, the autonomous running apparatus runs along the second route until, at least, the person recognizes a change in a moving direction of the autonomous running apparatus.

10. The autonomous running control method of the autonomous running apparatus according to claim 6, wherein after the autonomous running apparatus avoids the person, the avoiding route generating unit generates the first route so that an angle of change in a trajectory required for the person to contact with the autonomous running apparatus falls within a range of 30° to 50°.

11. The autonomous running control method of the autonomous running apparatus according to claim 6, wherein
when the contact possibility deciding unit decides that the person is likely to contact with the autonomous running apparatus, and even when the contact intention deciding unit cannot decide the intention of the person to contact with the autonomous running apparatus based on information about opening hour of a shop present within a range where the autonomous running apparatus moves because the shop is not present in the moving direction of the person or the shop present in the moving direction of the person is outside the opening hour, the access route generating unit generates a second route where the contact with the person is made.

12. An autonomous running control device of an autonomous running apparatus for changing a running route of the autonomous running apparatus according to a motion of a person with respect to the autonomous running apparatus that runs towards a destination given in advance, the apparatus comprising:
an avoiding route generating unit that generates a first route where the autonomous running apparatus avoids the person when the person is likely to contact with the autonomous running apparatus based on a position history of the person for predetermined time;
a contact intention deciding unit that decides whether the person has an intention to approach and make contact the autonomous running apparatus when the autonomous running apparatus runs along the first route generated by the avoiding route generating unit;
an access route generating unit that generates a second route where the autonomous running apparatus approaches the person when the contact intention deciding unit decides that the person has the intention to approach and make contact with the autonomous running apparatus; and
an autonomous running controller that controls running of the autonomous running apparatus along the first route or the second route so that the autonomous running apparatus makes contact with the person.

13. The autonomous running control device of the autonomous running apparatus according to claim 12, wherein
the decision in the contact intention deciding unit whether the person has the intention to approach the autonomous running apparatus is made by:
a person position obtaining unit that obtains a position of the person at every predetermined time;
a person moving state estimating unit that obtains the position history of the person for predetermined time from a position of the person at every predetermined time obtained by the person position obtaining unit and estimates a moving direction and a moving speed of the person; and
a contact possibility deciding unit that decides whether the person is likely to contact with the autonomous running apparatus based on the moving direction and moving speed of the person estimated by the person moving state estimating unit and running information for the autonomous running apparatus to run from a first position to a second position.

14. The autonomous running control device of the autonomous running apparatus according to claim 13, further comprising:
 a normal route generating unit that generates a third route for moving to the destination when the contact possibility deciding unit decides that the contact is unlikely to be made.

15. The autonomous running control device of the autonomous running apparatus according to claim 14, wherein
 the autonomous running controller:
  controls running of the autonomous running apparatus along the first route or the second route or the third route, and when the contact possibility deciding unit decides that the autonomous running apparatus is likely to contact with the person, and the contact intention deciding unit does not decide that the person has the intention to approach the autonomous running apparatus, controls the running of the autonomous running apparatus along the first route.

16. The autonomous running control device of the autonomous running apparatus according to claim 15, further comprising:
 a person position history database in which the position of the person obtained by the person position obtaining unit is recorded in chronological order; and
 an autonomous running apparatus database having the running information for the autonomous running apparatus to run from the first position to the second position, wherein
 the person moving state estimating unit obtains the position history of the person for the predetermined time from the position of the person at every predetermined time recorded in the person position history database, and estimates the moving direction and moving speed of the person,
 the contact possibility deciding unit decides whether the person is likely to contact with the autonomous running apparatus based on the moving direction and moving speed of the person estimated by the person moving state estimating unit, and the running information recorded in the autonomous running apparatus database.

17. The autonomous running control device of the autonomous running apparatus according to claim 16, wherein
 at least an opening hour of a shop present within a range where the autonomous running apparatus moves are recorded in the autonomous running apparatus database,
 when the contact possibility deciding unit decides that the person is likely to contact with the autonomous running apparatus, and even when the contact intention deciding unit cannot decide the intention of the person to contact with the autonomous running apparatus based on information about the opening hour of the shop present within the range where the autonomous running apparatus moves because the shop is not present in the moving direction of the person or the shop present in the moving direction of the person is outside the opening hour, the access route generating unit generates the second route where the contact with the person is made.

18. The autonomous running control device of the autonomous running apparatus according to claim 12, wherein
 after the autonomous running apparatus avoids the person, the avoiding route generating unit generates the first route so that an angle of change in a trajectory required for the person to contact with the autonomous running apparatus falls within a range of 30° to 50°.

19. A non-transitory computer-readable recording medium including a program for an autonomous running control device of an autonomous running apparatus for changing a running route of the autonomous running apparatus according to a motion of a person with respect to the autonomous running apparatus running towards a destination given in advance, the program making a computer function as:
 an avoiding route generating unit that generates a first route where the autonomous running apparatus avoids the person when the person is likely to contact with the autonomous running apparatus according to a position history of the person for predetermined time;
 a contact intention deciding unit that decides whether the person has an intention to approach and make contact the autonomous running apparatus when the autonomous running apparatus runs along the first route generated by the avoiding route generating unit;
 an access route generating unit that generates a second route where the autonomous running apparatus approaches the person when the contact intention deciding unit decides that the person has the intention to approach and make contact with the autonomous running apparatus; and
 an autonomous running controller that controls running of the autonomous running apparatus along the first route or the second route so that the autonomous running apparatus makes contact with the person.

\* \* \* \* \*